(12) United States Patent
Agiomyrgiannakis

(10) Patent No.: US 9,183,830 B2
(45) Date of Patent: *Nov. 10, 2015

(54) METHOD AND SYSTEM FOR NON-PARAMETRIC VOICE CONVERSION

(71) Applicant: Google Inc., Mountain View, CA (US)

(72) Inventor: Ioannis Agiomyrgiannakis, London (GB)

(73) Assignee: Google Inc., Mountain View, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/069,510

(22) Filed: Nov. 1, 2013

(65) Prior Publication Data

US 2015/0127350 A1   May 7, 2015

(51) Int. Cl.
| | | |
|---|---|---|
| *G10L 15/00* | (2013.01) | |
| *G10L 15/04* | (2013.01) | |
| *G10L 15/14* | (2006.01) | |
| *G10L 13/02* | (2013.01) | |
| G10L 21/003 | (2013.01) | |
| G10L 15/07 | (2013.01) | |
| G10L 13/033 | (2013.01) | |
| G10L 15/26 | (2006.01) | |

(52) U.S. Cl.
CPC ............. *G10L 13/02* (2013.01); *G10L 13/0335* (2013.01); *G10L 15/07* (2013.01); *G10L 15/144* (2013.01); *G10L 15/26* (2013.01); *G10L 21/003* (2013.01)

(58) Field of Classification Search
CPC ..... G10L 15/142; G10L 15/144; G10L 15/02; G10L 15/063; G10L 15/14; G10L 15/065; G10L 13/06; G10L 15/06; G10L 15/148; G10L 13/047; G10L 15/16; G10L 2021/0135; G06K 9/6297; G06K 9/00879; G06F 17/2715; G10H 2250/015

USPC .............. 704/256, 240, 251, 254, 255, 256.1, 704/256.2, 256.5, 256.6

See application file for complete search history.

(56) References Cited

U.S. PATENT DOCUMENTS

| | | | | |
|---|---|---|---|---|
| 5,129,002 | A | * | 7/1992 | Tsuboka ........................ 704/246 |
| 5,307,444 | A | * | 4/1994 | Tsuboka ......................... 706/20 |
| 5,440,662 | A | * | 8/1995 | Sukkar .......................... 704/236 |

(Continued)

OTHER PUBLICATIONS

Junichi Yamagishi, "Average-Voice-Based Speech Synthesis" PhD Thesis, 2006.

(Continued)

*Primary Examiner* — Edgar Guerra-Erazo
(74) *Attorney, Agent, or Firm* — McDonnell Boehnen Hulbert & Berghoff LLP

(57) ABSTRACT

A method and system is disclosed for non-parametric speech conversion. A text-to-speech (TTS) synthesis system may include hidden Markov model (HMM) HMM based speech modeling for both synthesizing output speech. A converted HMM may be initially set to a source HMM trained with a voice of a source speaker. A parametric representation of speech may be extract from speech of a target speaker to generate a set of target-speaker vectors. A matching procedure, carried out under a transform that compensates for speaker differences, may be used to match each HMM state of the source HMM to a target-speaker vector. The HMM states of the converted HMM may be replaced with the matched target-speaker vectors. Transforms may be applied to further adapt the converted HMM to the voice of target speaker. The converted HMM may be used to synthesize speech with voice characteristics of the target speaker.

30 Claims, 10 Drawing Sheets

(56) References Cited

U.S. PATENT DOCUMENTS

| | | | | |
|---|---|---|---|---|
| 5,617,509 | A * | 4/1997 | Kushner et al. | 704/256 |
| 5,679,001 | A * | 10/1997 | Russell et al. | 434/185 |
| 6,125,345 | A * | 9/2000 | Modi et al. | 704/240 |
| 6,212,500 | B1 * | 4/2001 | Kohler | 704/256 |
| 6,460,017 | B1 * | 10/2002 | Bub et al. | 704/256 |
| 6,629,073 | B1 * | 9/2003 | Hon et al. | 704/256.4 |
| 7,003,460 | B1 * | 2/2006 | Bub et al. | 704/256 |
| 7,216,077 | B1 * | 5/2007 | Padmanabhan et al. | 704/240 |
| 7,487,091 | B2 * | 2/2009 | Miyazaki | 704/255 |
| 7,565,282 | B2 * | 7/2009 | Carus et al. | 704/9 |
| 7,603,276 | B2 * | 10/2009 | Yoshizawa | 704/256.2 |
| 7,881,930 | B2 * | 2/2011 | Faisman et al. | 704/235 |
| 8,136,154 | B2 * | 3/2012 | Phoha et al. | 726/19 |
| 8,301,449 | B2 * | 10/2012 | He et al. | 704/257 |
| 8,620,655 | B2 * | 12/2013 | Xu et al. | 704/236 |
| 2005/0131694 | A1 * | 6/2005 | Nishitani et al. | 704/256 |
| 2005/0203737 | A1 * | 9/2005 | Miyazaki | 704/240 |
| 2006/0100874 | A1 * | 5/2006 | Oblinger et al. | 704/256.3 |
| 2006/0136209 | A1 * | 6/2006 | Menendez-Pidal et al. | 704/254 |
| 2006/0230140 | A1 * | 10/2006 | Aoyama et al. | 709/224 |
| 2008/0091424 | A1 * | 4/2008 | He et al. | 704/240 |
| 2008/0319743 | A1 * | 12/2008 | Faisman et al. | 704/235 |
| 2010/0198577 | A1 * | 8/2010 | Chen et al. | 704/2 |

OTHER PUBLICATIONS

Junichi Yamagishi, Bela Usabaev, Simon King, Oliver Watts, John Dines, Jilei Tian, Rile Hu, Keiichiro Oura, Keiichi Tokuda, Reima Karhila, Mikko Kurimo, "Thousands of Voices for HMM-based Speech Synthesis," Interspeech 2009, 10th Annual Conference of the International Speech Communication Association, Brighton, United Kingdom, Sep. 6-10, 2009.

Vincent Wan, Javier Latorre, Kayoko Yanagisawa, Norbert Braunschweiler, Langzhou Chen, Mark J. F. Gales, and Masami Akamine, "Building HMM-TTS Voices on Diverse Data," IEEE Journal of Selected Topics in Signal Processing, Vol. 8, No. 2, Apr. 2014, pp. 296-306.

Junichi Yamagishi, Oliver Watts, Simon King, Bela Usabaev, "Roles of the Average Voice in Speaker-adaptive HMM-based Speech Synthesis," Interspeech 2010, Sep. 26-30, 2010, Makuhari, Chiba, Japan, pp. 418-421.

Alan W Black, Heiga Zen, and Keiichi Tokuda, "Statistical Parametric Speech Synthesis," ICASSP 2007, pp. IV-1229-IV-1232.

Mouchtaris et al., "Non-Parallel Training for Voice Conversion by Maximum Likelihood Constrained Adaptation," Proceedings of the IEEE International Conference on Acoustics, Speech, and Signal Processing 2004 (ICASSP 2004), vol. 1, pp. I-1 to I-4.

Yannis Stylianou and Eric Moulines, "Continuous probabilistic transform for voice conversion," IEEE Transactions on Speech and Audio Processing, vol. 6, pp. 131-142, 1998.

Kuldip K Paliwal and Bishnu S Atal, "Efficient vector quantization of lpc parameters at 24 bits/frame," Speech and Audio Processing, IEEE Transactions on, vol. 1, No. 1, pp. 3-14, 1993.

W Bastiaan Kleijn and Kuldip K Paliwal, Speech coding and synthesis, Elsevier Science Inc., 1995.

Hui Ye and Steve Young, "Perceptually weighted linear transformations for voice conversion," in Proc. of the Eurospeech'03, 2003.

Vassilis D Diakoloukas and Vassilios V Digalakis, "Maximum-likelihood stochastic-transformation adaptation of hidden markov models," Speech and Audio Processing, IEEE Transactions on, vol. 7, No. 2, pp. 177-187, 1999.

Keiichi Tokuda, Heiga Zen, and Alan W Black, "An hmm-based speech synthesis system applied to english," in Speech Synthesis, 2002. Proceedings of 2002 IEEE Workshop on. IEEE, 2002, pp. 227-230.

Daniel Erro and Asunci'on Moreno, "Frame alignment method for cross-lingual voice conversion," in Interspeech, 2007.

Kenneth Rose, "Deterministic annealing for clustering, compression, classification, regression, and related optimization problems," Proceedings of the IEEE, vol. 86, No. 11, pp. 2210-2239, 1998.

Michael Pitz, Sirko Molau, Ralf Schluter, and Hermann Ney, "Vocal tract normalization equals linear transformation in cepstral space," in Proc. EuroSpeech2001, 2001.

Sankaran Panchapagesan and Abeer Alwan, "Frequency warping for vtln and speaker adaptation by linear transformation of standard mfcc," Computer speech &language, vol. 23, No. 1, pp. 42-64, 2009.

Yannis Stylianou, "Applying the harmonic plus noise model in concatenative speech synthesis," Speech and Audio Processing, IEEE Transactions on, vol. 9, No. 1, pp. 21-29, 2001.

Hideki Kawahara, "Straight, exploitation of the other aspect of vocoder: Perceptually isomorphic decomposition of speech sounds," Acoustical science and technology, vol. 27, No. 6, pp. 349-353, 2006.

Daniel Erro Eslava, "Intra-lingual and cross-lingual voice conversion using harmonic plus stochastic models," Barcelona, Spain: PhD Thesis, Universitat Politechnica de Catalunya, 2008.

Shrikanth Narayanan and Dagen Wang, "Speech rate estimation via temporal correlation and selected sub-band correlation," in Proc. of the IEEE Int. Conf. on Acoustics, Speech, and Signal Processing (ICASSP). Citeseer, 2005.

CJ Leggetter and PC Woodland, "Maximum likelihood linear regression for speaker adaptation of continuous density hidden markov models," Computer speech and language, vol. 9, No. 2, pp. 171, 1995.

Mark JF Gales and PC Woodland, "Mean and variance adaptation within the mllr framework," Computer Speech and Language, vol. 10, No. 4, pp. 249-264, 1996.

Junichi Yamagishi, "Average-voice-based speech synthesis," Tokyo Institute of Technology, 2006.

Mikiko Mashimo, Tomoki Toda, Kiyohiro Shikano, and Nick Campbell, "Evaluation of crosslanguage voice conversion based on gmm and straight," 2001.

Alexander Kain and Michael W Macon, "Spectral voice conversion for text-to-speech synthesis," in Acoustics, Speech and Signal Processing, 1998. Proceedings of the 1998 IEEE International Conference on. IEEE, 1998, vol. 1, pp. 285-288.

Daisuke Saito, ShinjiWatanabe, Atsushi Nakamura, and Nobuaki Minematsu, "Statistical voice conversion based on noisy channel model," Audio, Speech, and Language Processing, IEEE Transactions on, vol. 20, No. 6, pp. 1784-1794, 2012.

David Sundermann, Antonio Bonafonte, Hermann Ney, and Harald Hoge, "A first step towards text-independent voice conversion," in Proc. of the ICSLP'04, 2004.

Arun Kumar and Ashish Verma, "Using phone and diphone based acoustic models for voice conversion: a step towards creating voice fonts," in Multimedia and Expo, 2003. ICME'03. Proceedings. 2003 International Conference on. IEEE, 2003, vol. 1, pp. I-393.

Vassilios V Digalakis, Dimitry Rtischev, and Leonardo G Neumeyer, "Speaker adaptation using constrained estimation of gaussian mixtures," Speech and Audio Processing, IEEE Transactions on, vol. 3, No. 5, pp. 357-366, 1995.

Masatsune Tamura, Takashi Masuko, Keiichi Tokuda, and Takao Kobayashi, "Adaptation of pitch and spectrum for hmm-based speech synthesis using mllr," in Acoustics, Speech, and Signal Processing, 2001. Proceedings.(ICASSP'01). 2001 IEEE International Conference on. IEEE, 2001, vol. 2, pp. 805-808.

M-W Feng, Richard Schwartz, Francis Kubala, and John Makhoul, "Iterative normalization for speaker-adaptive training in continuous speech recognition," in Acoustics, Speech, and Signal Processing, 1989. ICASSP-89., 1989 International Conference on. IEEE, 1989, pp. 612-615.

H Valbret, E Moulines, and Jean-Pierre Tubach, "Voice transformation using psola technique," Speech Communication, vol. 11, No. 2, pp. 175-187, 1992.

Daniel Erro, Inaki Sainz, Eva Navas, and Inma Hern'aez, "Improved hnm-based vocoder for statistical synthesizers," in Proc. Interspeech, 2011, pp. 1809-1812.

Yamato Ohtani, Tomoki Toda, Hiroshi Saruwatari, and Kiyohiro Shikano, "Maximum likelihood voice conversion based on gmm with straight mixed excitation," in Proc. ICSLP, 2006, pp. 2266-2269.

R Faltlhauser, T Pfau, and G Ruske, "On-line speaking rate estimation using gaussian mixture models," in Acoustics, Speech, and Signal Processing, 2000. ICASSP'00. Proceedings. 2000 IEEE International Conference on. IEEE, 2000, vol. 3, pp. 1355-1358.

(56) References Cited

OTHER PUBLICATIONS

Daniel Erro, Asunci'on Moreno, and Antonio Bonafonte, "Inca algorithm for training voice conversion systems from nonparallel corpora," Audio, Speech, and Language Processing, IEEE Transactions on, vol. 18, No. 5, pp. 944-953, 2010.

Athanasios Mouchtaris, Jan Van der Spiegel, and Paul Mueller, "Non-parallel training for voice conversion by maximum likelihood constrained adaptation," in Acoustics, Speech, and Signal Processing, 2004. Proceedings.(ICASSP'04). IEEE International Conference on. IEEE, 2004, vol. 1, pp. I-1.

Heiga Zen, Keiichi Tokuda, and Alan W Black, "Statistical parametric speech synthesis," Speech Communication, vol. 51, No. 11, pp. 1039-1064, 2009.

Junichi Yamagishi, Takashi Nose, Heiga Zen, Zhen-Hua Ling, Tomoki Toda, Keiichi Tokuda, Simon King, and Steve Renals, "Robust speaker-adaptive hmm-based text-to-speech synthesis," Audio, Speech, and Language Processing, IEEE Transactions on, vol. 17, No. 6, pp. 1208-1230, 2009.

Yi-Jian Wu, Yoshihiko Nankaku, and Keiichi Tokuda, "State mapping based method for cross-lingual speaker adaptation in hmm-based speech synthesis," in Proc. of Interspeech, 2009, pp. 528-531.

Robert J McAulay and Thomas F Quatieri, "Computationally efficient sine-wave synthesis and its application to sinusoidal transform coding," in Acoustics, Speech, and Signal Processing, 1988. ICASSP-88., 1988 International Conference on. IEEE, 1988, pp. 370-373.

Xianglin Peng, Keiichiro Oura, Yoshihiko Nankaku, and Keiichi Tokuda, "Cross-lingual speaker adaptation for hmm-based speech synthesis considering differences between language-dependent average voices," in Signal Processing (ICSP), 2010 IEEE 10th International Conference on. IEEE, 2010, pp. 605-608.

* cited by examiner

METHOD AND SYSTEM FOR NON-PARAMETRIC VOICE CONVERSION

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees."

A goal of speech synthesis technology is to convert written language into speech that can be output in an audio format, for example directly or stored as an audio file suitable for audio output. The written language could take the form of text, or symbolic linguistic representations. The speech may be generated as a waveform by a speech synthesizer, which produces articifical human speech. Natural sounding human speech may also be a goal of a speech synthesis system.

Various technologies, including computers, network servers, telephones, and personal digital assistants (PDAs), can be employed to implement an ASR system and/or a speech synthesis system, or one or more components of such systems. Communication networks may in turn provide communication paths and links between some or all of such devices, supporting speech synthesis system capabilities and services that may utilize ASR and/or speech synthesis system capabilities.

BRIEF SUMMARY

In one aspect, an example embodiment presented herein provides a method comprising: training an source hidden Markov model (HMM) based speech features generator implemented by one or more processors of a system using speech signals of a source speaker, wherein the source HMM based speech features generator comprises a configuration of source HMM state models, each of the source HMM state models having a set of generator-model functions; extracting speech features from speech signals of a target speaker to generate a target set of target-speaker vectors; for each given source HMM state model of the configuration, determining a particular target-speaker vector from among the target set that most closely matches parameters of the set of generator-model functions of the given source HMM; determining a fundamental frequency (F0) transform that speech-adapts F0 statistics of the source HMM based speech features generator to match F0 statistics of the speech of the target speaker; constructing a converted HMM based speech features generator implemented by one or more processors of the system to be the same as the source HMM based speech features generator, but wherein the parameters of the set of generator-model functions of each source HMM state model of the converted HMM based speech features generator are replaced with the determined particular most closely matching target-speaker vector from among the target set; and speech-adapting F0 statistics of the converted HMM based speech features generator using the F0 transform to thereby produce a speech-adapted converted HMM based speech features generator.

In another aspect, an example embodiment presented herein provides a method comprising: implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker; providing a set of target-speaker vectors, the set of target-speaker vectors having been generated from speech features extracted from speech signals of a target speaker; implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker; receiving an enriched transcription of a run-time text string by an input device of the system; using the converted HMM based speech features generator to convert the enriched transcription into corresponding output speech features; and generating a synthesized utterance of the enriched transcription using the output speech features, the synthesized utterance having voice characteristics of the target speaker.

In still another respect, an example embodiment presented herein provides a system comprising: one or more processors; memory; and machine-readable instructions stored in the memory, that upon execution by the one or more processors cause the system to carry out functions including: implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker; providing a set of target-speaker vectors, the set of target-speaker vectors having been generated from speech features extracted from speech signals of a target speaker; implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker.

In yet another aspect, an example embodiment presented herein provides an article of manufacture including a computer-readable storage medium having stored thereon program instructions that, upon execution by one or more processors of a system cause the system to perform operations comprising: implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker; providing a set of target-speaker vectors, the set of target-speaker vectors having been generated from speech features extracted from speech signals of a target speaker; implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker.

In yet a further aspect, an example embodiment presented herein provides an article of manufacture including a computer-readable storage medium, having stored thereon program instructions that, upon execution by one or more processors of a system, cause the system to perform operations comprising: training an source hidden Markov model (HMM) based speech features generator using speech signals of a source speaker, wherein the source HMM based speech features generator comprises a configuration of source HMM state models, each of the source HMM state models having a set of generator-model functions; extracting speech features from speech signals of a target speaker to generate a target set of target-speaker vectors; for each given source HMM state model of the configuration, determining a particular target-speaker vector from among the target set that most closely matches parameters of the set of generator-model functions of the given source HMM; determining a fundamental frequency (F0) transform that speech-adapts F0 statistics of the source HMM based speech features generator to match F0 statistics of the speech of the target speaker; constructing a converted HMM based speech features generator to be the same as the source HMM based speech features generator, but wherein the parameters of the set of generator-model functions of each source HMM state model of the converted HMM based speech features generator are replaced with the determined particular most closely matching target-speaker vector from among the target set; and speech-adapting F0 statistics of the converted HMM based speech features generator using the F0 transform to thereby produce a speech-adapted converted HMM based speech features generator.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
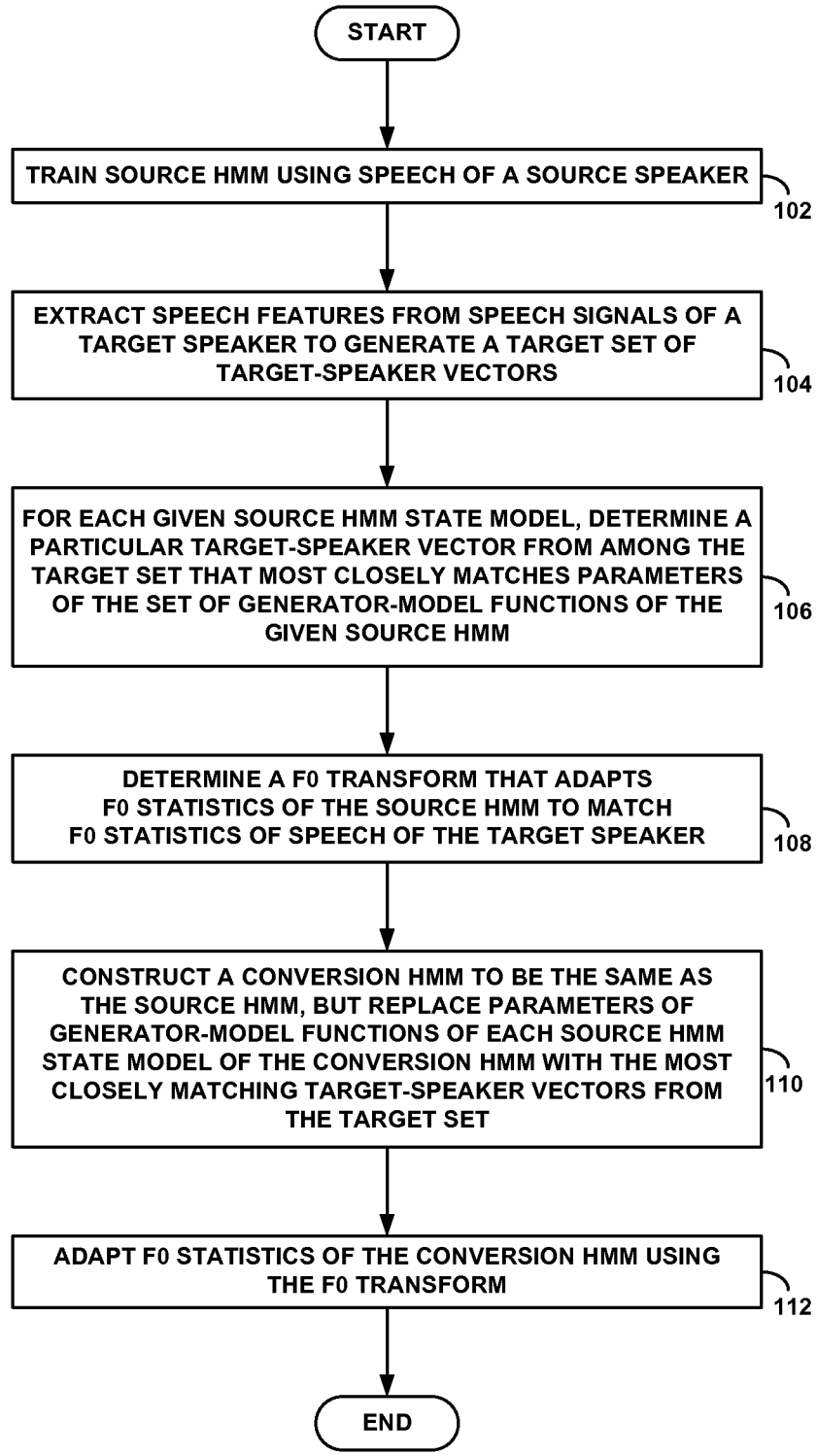
FIG. 1 is a flowchart illustrating an example method in accordance with an example embodiment.

A speech synthesis system can be a processor-based system configured to convert written language into artificially produced speech or spoken language. The written language could be written text, such as one or more written sentences or text strings, for example. The written language could also take the form of other symbolic representations, such as a speech synthesis mark-up language, which may include information indicative of speaker emotion, speaker gender, speaker identification, as well as speaking styles. The source of the written text could be input from a keyboard or keypad of a computing device, such as a portable computing device (e.g., a PDA, smartphone, etc.), or could be from file stored on one or another form of computer readable storage medium. The artificially produced speech could be generated as a waveform from a signal generation device or module (e.g., a speech synthesizer device), and output by an audio playout device and/or formatted and recorded as an audio file on a tangible recording medium. Such a system may also be referred to as a "text-to-speech" (TTS) system, although the written form may not necessarily be limited to only text.

A speech synthesis system may operate by receiving an input text string (or other form of written language), and translating the written text into an enriched transcription corresponding to a symbolic representation of how the spoken rendering of the text sounds or should sound. The enriched transcription may then be mapped to speech features that parameterize an acoustic rendering of the enriched transcription, and which then serve as input data to a signal generation module device or element that can produce an audio waveform suitable for playout by an audio output device. The playout may sound like a human voice speaking the words (or sounds) of the input text string, for example. In the context of speech synthesis, the more natural the sound (e.g., to the human ear) of the synthesized voice, generally the better the voice quality. The audio waveform could also be generated as an audio file that may be stored or recorded on storage media suitable for subsequent playout.

In operation, a TTS system may be used to convey information from an apparatus (e.g. a processor-based device or system) to a user, such as messages, prompts, answers to questions, instructions, news, emails, and speech-to-speech translations, among other information. Speech signals may themselves carry various forms or types of information, including linguistic content, effectual state (e.g., emotion and/or mood), physical state (e.g., physical voice characteristics), and speaker identity, to name a few.

Some applications of a TTS system may benefit from an ability to convey speaker identity in the sound of the synthesized voice. For example, TTS delivery of emails or other text-based messages could be synthesized in a voice that sounds like the sender. As another example, text-based conversation (e.g., "chat") applications, in which two or more participants provide text-based input, could similarly deliver synthesized speech output in the respective voices that sound like those of the participants. In general, the quality of communication may be improved or enhanced when speaker voices are known, familiar, and/or distinguishable. These applications represent examples of a technology typically referred to as "intra-lingual voice conversion." Similar benefits may accrue for "cross-lingual voice conversion," such as may be used in a speech-to-speech (S2S) system that translates input speech in one language to output speech in another language. Communication may sound more natural when the synthesized output speech has voice characteristics of the input speech.

A TTS system may use a statistical model of a parametric representation of speech to synthesize speech. In particular, statistical modeling may be based on hidden Markov models (HMMs). One advantageous aspect of HMM-based speech synthesis is that it can facilitate altering or adjusting characteristics of the synthesized voice using one or another form of statistical adaptation. For example, given data in the form of recordings of a target speaker, the HMM can be adapted to the data so as to make the HMM-based synthesizer sound like the target speaker. The ability to adapt HMM-based synthesis can therefore make it a flexible approach.

Methods used for statistical adaptation of HMMs and of Gaussian mixture models (GMMs) may also be applied to voice conversion. However, conventional methods typically employ a parametric approach to voice conversion, in the sense that they attempt to find an optimal transform that adapts the statistics of the HMM to the statistics of a target speaker. The adaptation is made in terms of maximum-likelihood, usually regardless of the model. For example, the adaptation may be made by applying a transformation to parameters of Gaussian states of the HMM. A side-effect of this transformation is that it can an over-smooth spectral envelopes of the HMM, which can in turn result in lower-quality speech having a muffled character. Other defects may be introduced as well.

Example embodiments are described herein for a method and system for non-parametric voice conversion for HMM-based speech synthesis that, among other advantages, can overcome limitations and drawbacks of conventional approaches of voice conversion based on statistical adaptation. More specifically, statistical adaptation is predicated on adapting models to describe a target speaker as well as possible in terms of likelihood, while in voice conversion the goal is for models to sound like the target speaker. Target speaker recordings can contain variability that may not necessarily be related to voice characteristics or qualitative aspects. For example, they may contain multiple versions of a phonetic speech unit (e.g., a phoneme) that are unrelated to linguistic/effectual content and instead are due to random variations. In terms of adaptation, all versions of this phonetic speech unit would typically be modeled as variations of a phenomenon that the model needs to capture. The result in terms of voice conversion could tend to be the model of the phonetic speech unit sounding muffled, for example. In terms of voice conversion, however, a more appropriate goal might be to model just one of the multiple versions. Thus, the variability over multiple realizations of the phonetic speech unit could be considered perceptually redundant. This can be interpreted as a mismatch between the underlying goals of statistical adaptation and voice conversion.

In accordance with example embodiments, an HMM-based TTS system may be trained using extensive standard-voice recordings of a "source" speaker. This can amount to application of high-quality, proven training techniques, for example. Referring to the HMM of the TTS system as a "source HMM," this training process may be said to train the source HMM in the voice of the source speaker. As a result, the source HMM acquires a set of Gaussian statistical generator functions that have been iteratively and cumulatively built based on voice characteristics the source speaker. The Gaussian generator functions of the source HMM correspond to probability density functions (PDFs) for jointly modeling spectral envelope parameters and excitation parameters of phonetic speech units. The phonetic speech units could be phonemes or triphones, for example.

Also in accordance with example embodiments, speech features may be extracted from speech signals of a "target speaker" in order to generate set of target-speaker vectors that parameterize the speech signals. For example, the speech signals could be voice recordings of the target speaker.

In further accordance with example embodiments, an analytical matching procedure may be carried out to identify for parameters of each Gaussian statistical generator function of the source HMM a closest match speech vector from among the set of target-speaker vectors. This process is enabled by a novel and effective "matching under transform" algorithm, and results in a set of Gaussian statistical generator functions fashioned from characteristics of the target voice that can be applied by the source HMM. This process is enabled by a novel and effective "matching under transform" technique, and results in a set of Gaussian statistical generator functions fashioned from characteristics of the target speaker's voice that can be applied by the source HMM. The matching under transform ("MUT") technique entails a matching procedure that can compensate for inter-speaker speech differences (e.g., differences between the source speaker and the target speaker). The matching procedure can be specified in terms of a MUT algorithm suitable for implementation as executable instructions on one or more processors of a system, such as a TTS system. Taken with additional steps described below, the effect can be to construct a speech synthesizer with voice characteristics of the target speaker.

As an additional aspect of matching, a transform that adapts statistics of fundamental frequency (F0) of the source HMM to the F0 statistics of the target speaker is computed. In the context of speech recognition and synthesis, F0 relates to the pitch of the voice.

In a further aspect of example embodiments, a converted HMM is constructed by first creating a copy of the source HMM, such that the converted HMM initially has the Gaussian statistical generator functions of the source HMM. Next, the parameters of the Gaussian statistical generator functions of the converted HMM, which are initially the same as those of the source HMM, are replaced with the target-speaker vectors identified using the matching under transform algorithm. Finally, the F0 transformation is applied to the converted HMM. The converted HMM can now be considered as being configured to generate acoustic features of speech units characterized by the sound of the target voice.

In accordance with example embodiments, the source HMM of the TTS system may be replaced with the converted HMM, prepared as described above. At run-time, the TTS speech synthesizer may then be used to synthesize speech with voice characteristics of the target speaker.

2. Example Methods

In example embodiments, a TTS synthesis system may include one or more processors, one or more forms of memory, one or more input devices/interfaces, one or more output devices/interfaces, and machine-readable instructions that when executed by the one or more processors cause the TTS synthesis system to carry out the various functions and tasks described herein. The TTS synthesis system may also include implementations based on one or more hidden Markov models. In particular, the TTS synthesis system may employ methods that incorporate HMM-based speech synthesis, HMM-based speech recognition, and HMM-based voice conversion, as well as other possible components. Two examples of such a method are described in the current section.

FIG. 1 is a flowchart illustrating an example method in accordance with example embodiments. At step 102, a source HMM based speech features generator, implemented by one or more processors of the system, is trained using speech signals of a source speaker. Speech features generated by the source HMM-based speech features generator may be used for synthesis of speech. More particularly, speech features generally include quantitative measures of acoustic properties of speech that may be processed, for example by a speech synthesizer apparatus, to produce synthesized speech. The source HMM based speech features generator may include a configuration of source HMM state models, each of which has a set of generator-model functions. The source HMM state models are used to model states, and transitions between states, of phonetic units. The set of generator-model functions for each source HMM state model specifies how speech features corresponding to the modeled phonetic unit are generated.

At step 104, speech features are extracted from speech signals of a target speaker to generate a set of target-speaker vectors. The speech signals could be provided in real-time by the target speaker, or could be contained in voice recordings of the target speaker. More generally, the process of extracting speech features from speech signals is referred to herein as "feature extraction," and may be considered as generating a parameterized representation of speech signals, the parameters or "features" being elements of "feature vectors." The target-speaker vectors generated at step 104 can thus be considered feature vectors generated from speech of the target speaker. In accordance with example embodiments, feature extraction can entail decomposing the speech signals of a speaker (e.g., the target the speaker in the current example method) into at least one of spectral envelopes, aperiodicity envelopes, fundamental frequencies, or voicing. Feature extraction could produce other types of features as well.

At step 106, a procedure for matching parameters of the generator-model functions of the source HMM state models and target-speaker vectors from among the target set is carried out. Specifically, for each given source HMM state model of the configuration, a particular target-speaker vector from among the target set that most closely matches the parameters of the set of generator-model functions of the given source HMM is determined. As described in more detail below, the matching is determined using a procedure that simultaneously applies a parametric, transformation-based mapping from an analytic space of the source HMM state models to an analytic vector space of the target set of target-speaker vectors, and a nonparametric, probabilistic-associative mapping from the analytic vector space of the target set of target-speaker vectors to the analytic space of the source HMM state models. Referred to herein as "matching under transform" ("MUT"), the matching procedure can compensate for differences between speech (e.g., voice) of the source speaker and speech (e.g., voice) of the target speaker.

At step 108, a fundamental frequency (F0) transform that speech-adapts F0 statistics of the source HMM based speech features generator to match F0 statistics of the target speaker is determined.

At step 110, a "conversion" HMM based speech features generator is constructed for mapping between the target speaker and the source HMM based speech features generator. More particularly, the converted HMM based speech features generator, also implemented by one or more processors of the system, is constructed to initially be the same as the source HMM based speech features generator. Thus, the converted HMM base speech features generator initially has the source HMM state models and generator-model functions of the source HMM based speech features generator. Then, the parameters of the set of generator-model functions of each source HMM state model of the converted HMM based speech features generator is replaced with the determined particular most closely matching target-speaker vector from among the target set, as determined at step 106.

Finally, at step 112, the F0 statistics of the converted HMM based speech features generator are speech-adapted using the F0 transform determined at step 108. The result may be referred to as a speech-adapted converted HMM based speech features generator.

In accordance with example embodiments, the source HMM based speech features generator and the converted HMM based speech features generator could be implemented by at least one common processor from among the one or more processors of the system. For example, both could be implemented by a single, common processor. Alternatively, either or both could be implemented in a distributed fashion, such that they share at least one common processor. As still a further alternative, they could be implemented without sharing any processor(s). Other implementation of the two HMM based speech features generators among configurations of the one or more processors of the system are possible as well.

In further accordance with example embodiments, the TTS synthesis system may be used to carry out run-time voice conversion to the voice of the target speaker. More particularly, operating in a run-time mode, the TTS synthesis system could create an enriched transcription of a run-time text string. Next, the speech-adapted converted HMM based speech features generator could be used to convert the enriched transcription into corresponding output speech features. Finally, a synthesized utterance of the enriched transcription could be generated using the output speech features. The synthesized utterance could thereby have voice characteristics of the target speaker.

In still further accordance with example embodiments, creating the enriched transcription of the run-time text string could entail receiving the run-time text string at the TTS synthesis system, and converting the received run-time text string into the enriched transcription of the run-time text string by the TTS synthesis system. As used herein, an enriched transcription is a symbolic representation of the phonetic and linguistic content of written text or other symbolic form of speech. It can take the form of a sequence or concatenation of labels (or other text-based identifier), each label identifying a phonetic speech unit, such as a phoneme or triphone, and further identifying or encoding linguistic and/or syntactic context, temporal parameters, and other information for specifying how to render the symbolically-represented sounds as meaningful speech in a given language. Generating the synthesized utterance could correspond to synthesizing speech using the output speech features.

More specifically, taking the enriched transcription to be observed data, the converted HMM based speech features generator can be used to model speech features corresponding to the received text string. The modeled speech features can serve as input to a speech synthesizer, such a vocoder, in order to generate synthesized speech. By preparing the converted HMM based speech features generator as described above, the synthesized output voice is made to sound like that of the target speaker. The effect is to render text entered or supplied by the target speaker into synthesized speech that sounds like the target speaker's voice.

In accordance with example embodiments, the set of generator-model functions for each given source HMM state model could include a multivariate spectral probability density function (PDF) for jointly modeling spectral envelope parameters of a phonetic unit modeled by a given source HMM state model, and a multivariate excitation PDF for jointly modeling excitation parameters of the phonetic unit. By way of example, phonetic speech units could phonemes and/or triphones.

With generator-model functions defined as multivariate PDFs, the matching procedure of step 106 may be described in terms of finding target-speaker vectors that differ minimally from parameters of the multivariate PDFs. More specifically, making a determination of a particular target-speaker vector from among the target set that most closely matches parameters of the set of generator-model functions of the given source HMM could entail determining a target-speaker vector from among the target set that is computationally nearest to parameters of the multivariate spectral PDF of the given source HMM state model in terms of a distance criterion that could be based on mean-squared-error (mse) or the Kullback-Leibler distance. Making the determination could additionally entail determining a target-speaker vector from among the target set that is computationally nearest to the multivariate excitation PDF of the given output HMM state model in terms of a distance criterion that could be based on mse or the Kullback-Leibler distance.

In further accordance with example embodiments, determining the particular target-speaker vector from among the target set that most closely matches parameters of the set of generator-model functions of the given source HMM could entail making a determination an optimal correspondence between a multivariate PDF of the given source HMM and a particular target-speaker vector from among the target set. As mentioned above and discussed in more detail below, the determination could made under a transform that compensates for differences between speech of the source speaker and speech of the target speaker. That is, a matching under transform technique could be used to make an optimal matching determination.

In further accordance with example embodiments, the multivariate spectral PDF of each source HMM state model could have the mathematical form of a multivariate Gaussian function. While generator-model functions of HMMs can take the form of Gaussian PDFs, this is not necessarily a requirement.

In further accordance with example embodiments, the spectral envelope parameters of the phonetic units could be Mel Cepstral coefficients, Line Spectral Pairs, Linear Predictive coefficients, Mel-Generalized Cepstral Coefficients, or other acoustic-related quantities. In addition, the spectral envelope parameters of the phonetic units of the output language could also include first and second time derivatives of the acoustic-related quantities of the output language. As noted above, extraction of features from speech signals of the target speaker can entail decomposing the speech signals of a speaker (e.g., the target the speaker in the current example method) into at least one of spectral envelopes, aperiodicity envelopes, fundamental frequencies, or voicing.

In accordance with example embodiments, construction of the converted HMM based speech features generator at step 110 could entail transforming the source HMM based speech features generator into the converted HMM based speech features generator. More particularly, the parameters of the set of generator-model functions of each source HMM state model of the source HMM based speech features generator could be replaced with the particular most closely matching target-speaker vector from among the target set, as determined at step 106. The F0 statistics of the transformed source HMM based speech features generator could then be speech-adapted using the F0 transform determined as step 108. In this approach, the converted HMM based speech features generator can be viewed as being constructed "in place" from the source HMM based speech features generator.

Figure 2:
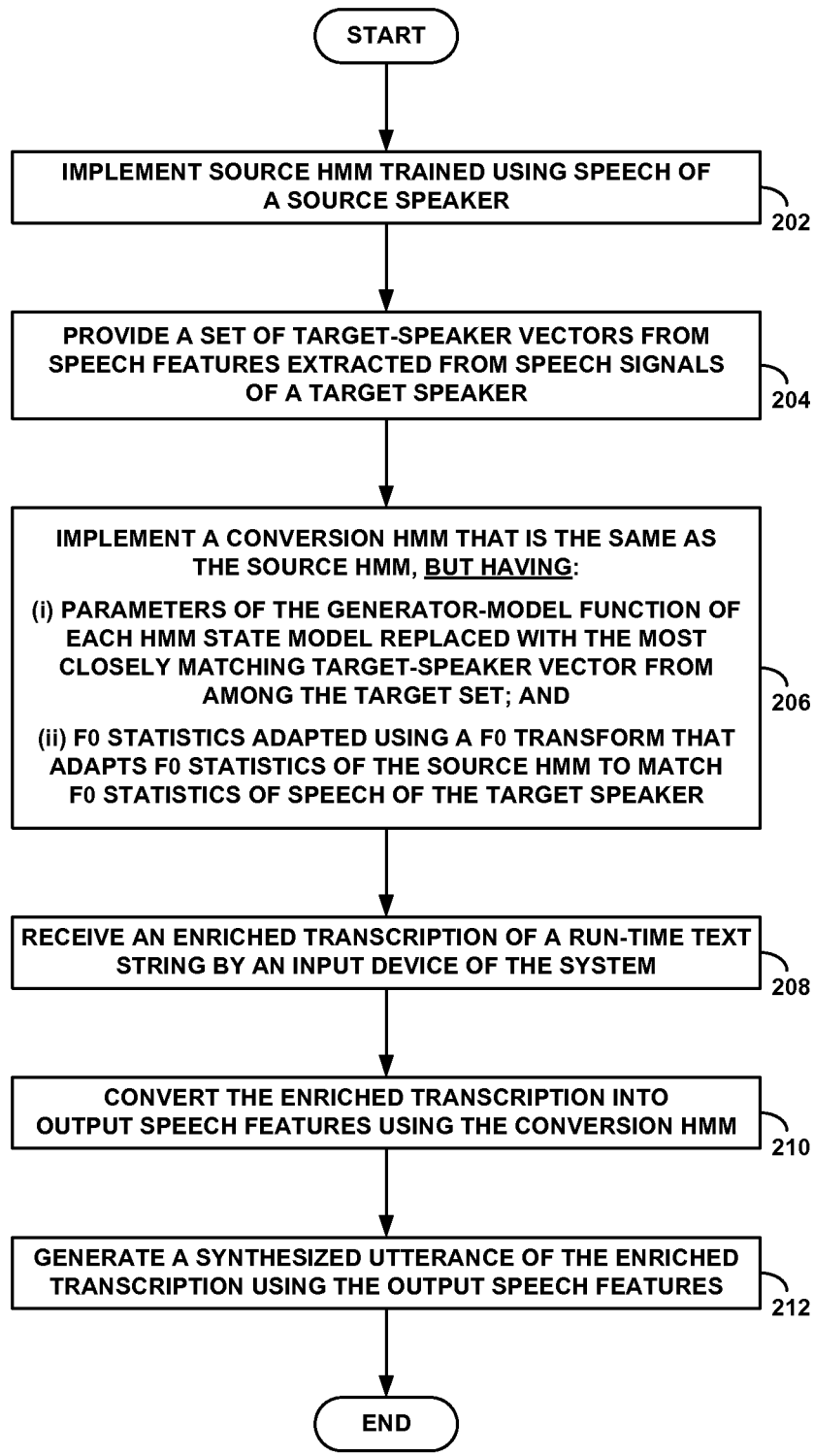
FIG. 2 is a flowchart illustrating an example method in accordance with another example embodiment.

FIG. 2 is a flowchart illustrating an example an alternative method in accordance with example embodiments. At step 202 a source HMM based speech features generator is implemented by one or more processors of a TTS synthesis system. The implemented source HMM based speech features generator can include a configuration of source HMM state models, and each of the source HMM state models may have a set of generator-model functions. Further, the implemented source HMM based speech features generator is trained using speech signals of a source speaker speaking.

At step 204, a set of target-speaker vectors is provided. More particularly, the set of target-speaker vectors can be generated from speech features extracted from speech signals of the As described above, the target-speaker vectors (or, more generally, feature vectors) can be the product of feature extraction, and may be considered to be a parameterized representation of speech signals. Again, feature extraction can entail decomposing the speech signals of a speaker (e.g., the target the speaker in the current example method) into at least one of spectral envelopes, aperiodicity envelopes, fundamental frequencies, or voicing. And feature extraction could produce other types of features as well. target speaker.

At step 206, a converted HMM based speech features generator is implemented that is the same as the source HMM based speech features generator, but with some specific differences. In particular, the parameters of the set of generator-model functions of each given source HMM state model of the converted HMM based speech features generator is replaced with a particular target-speaker vector from among the target set that most closely matches the parameters of the set of generator-model functions of the given source HMM. In addition, fundamental frequency (F0) statistics of the converted HMM based speech features generator are speech-adapted using an F0 transform that speech-adapts F0 statistics of the source HMM based speech features generator to match F0 statistics of the target speaker.

At step 208, the TTS synthesis system could receive an enriched transcription of a run-time text string. The run-time text string could be received at an input device of the TTS synthesis system, and the enriched transcription could include a sequence or concatenation of labels (or other text-based identifier). As described above, each label could identify a phonetic speech unit, such as a phoneme or triphone, and further identify or encode linguistic and/or syntactic context, temporal parameters, and other information for specifying how to render the symbolically-represented sounds as meaningful speech in a given language.

At step 210, the TTS synthesis system could use the converted HMM based speech features generator to convert the enriched transcription into corresponding output features. As described above, taking the enriched transcription to be observed data, the converted HMM based speech features generator can be used to model speech features corresponding to the received text string.

Finally, at step 212, a synthesized utterance of the enriched transcription could be generated using the output speech features. The synthesized utterance could thereby have voice characteristics of the target speaker.

It will be appreciated that the steps shown in FIGS. 1 and 2 are meant to illustrate a methods in accordance with example embodiments. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 3:
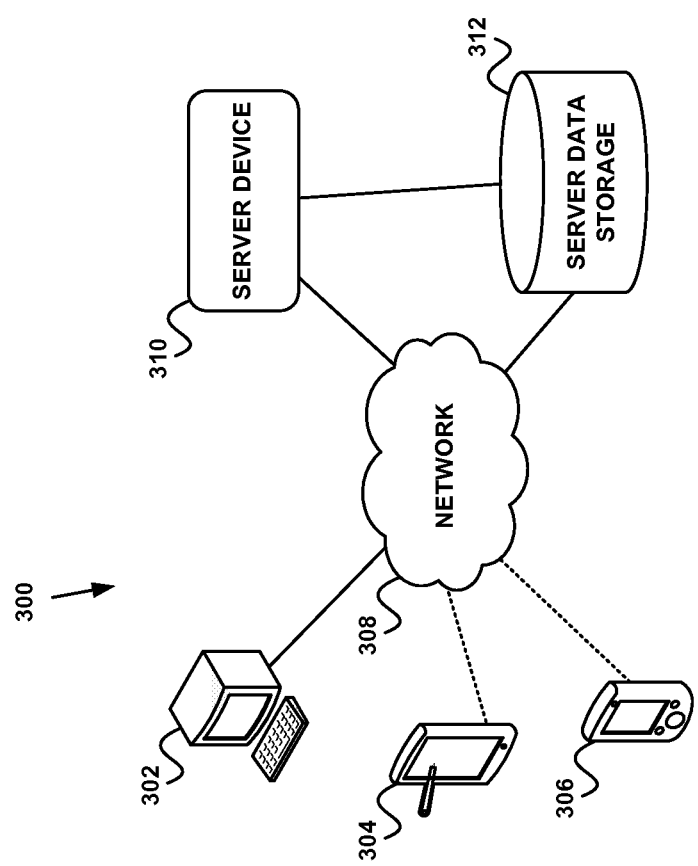
FIG. 3 is a block diagram of an example network and computing architecture, in accordance with an example embodiment.

FIG. 3 is a simplified block diagram of a communication system 300, in which various embodiments described herein can be employed. Communication system 300 includes client devices 302, 304, and 306, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 308 through the use of wireline connections (designated by solid lines) and/or wireless connections (designated by dashed lines).

Network 308 may be, for example, the Internet, or some other form of public or private Internet Protocol (IP) network. Thus, client devices 302, 304, and 306 may communicate using packet-switching technologies. Nonetheless, network 308 may also incorporate at least some circuit-switching technologies, and client devices 302, 304, and 306 may communicate via circuit switching alternatively or in addition to packet switching.

A server device 310 may also communicate via network 308. In particular, server device 310 may communicate with client devices 302, 304, and 306 according to one or more network protocols and/or application-level protocols to facilitate the use of network-based or cloud-based computing on these client devices. Server device 310 may include integrated data storage (e.g., memory, disk drives, etc.) and may also be able to access a separate server data storage 312. Communication between server device 310 and server data storage 312 may be direct, via network 308, or both direct and via network 308 as illustrated in FIG. 3. Server data storage 312 may store application data that is used to facilitate the operations of applications performed by client devices 302, 304, and 306 and server device 310.

Although only three client devices, one server device, and one server data storage are shown in FIG. 3, communication system 300 may include any number of each of these components. For instance, communication system 300 may comprise millions of client devices, thousands of server devices and/or thousands of server data storages. Furthermore, client devices may take on forms other than those in FIG. 3.

b. Example Server Device and Server System

Figure 4A:
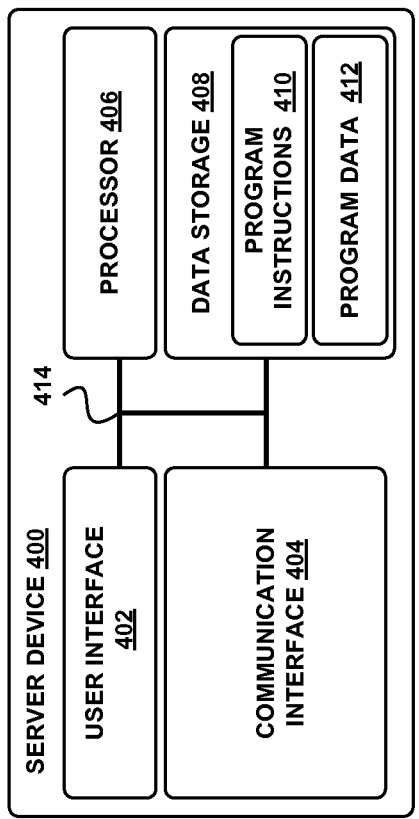
FIG. 4A is a block diagram of a server device, in accordance with an example embodiment.

FIG. 4A is a block diagram of a server device in accordance with an example embodiment. In particular, server device 400 shown in FIG. 4A can be configured to perform one or more functions of server device 310 and/or server data storage 312. Server device 400 may include a user interface 402, a communication interface 404, processor 406, and data storage 408, all of which may be linked together via a system bus, network, or other connection mechanism 414.

User interface 402 may comprise user input devices such as a keyboard, a keypad, a touch screen, a computer mouse, a track ball, a joystick, and/or other similar devices, now known or later developed. User interface 402 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 402 may be configured to generate audible output(s), via a speaker, speaker jack, audio output port, audio output device, earphones, and/or other similar devices, now known or later developed. In some embodiments, user interface 402 may include software, circuitry, or another form of logic that can transmit data to and/or receive data from external user input/output devices.

Communication interface 404 may include one or more wireless interfaces and/or wireline interfaces that are configurable to communicate via a network, such as network 308 shown in FIG. 3. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 404 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 406 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 406 may be configured to execute computer-readable program instructions 410 that are contained in data storage 408, and/or other instructions, to carry out various functions described herein.

Data storage 408 may include one or more non-transitory computer-readable storage media that can be read or accessed by processor 406. The one or more computer-readable storage media may include volatile and/or non-volatile storage components, such as optical, magnetic, organic or other memory or disc storage, which can be integrated in whole or in part with processor 406. In some embodiments, data storage 408 may be implemented using a single physical device (e.g., one optical, magnetic, organic or other memory or disc storage unit), while in other embodiments, data storage 408 may be implemented using two or more physical devices.

Data storage 408 may also include program data 412 that can be used by processor 406 to carry out functions described herein. In some embodiments, data storage 408 may include, or have access to, additional data storage components or devices (e.g., cluster data storages described below).

Referring again briefly to FIG. 3, server device 310 and server data storage device 312 may store applications and application data at one or more locales accessible via network 308. These locales may be data centers containing numerous servers and storage devices. The exact physical location, connectivity, and configuration of server device 310 and server data storage device 312 may be unknown and/or unimportant to client devices. Accordingly, server device 310 and server data storage device 312 may be referred to as "cloud-based" devices that are housed at various remote locations. One possible advantage of such "cloud-based" computing is to offload processing and data storage from client devices, thereby simplifying the design and requirements of these client devices.

In some embodiments, server device 310 and server data storage device 312 may be a single computing device residing in a single data center. In other embodiments, server device 310 and server data storage device 312 may include multiple computing devices in a data center, or even multiple computing devices in multiple data centers, where the data centers are located in diverse geographic locations. For example, FIG. 3 depicts each of server device 310 and server data storage device 312 potentially residing in a different physical location.

Figure 4B:
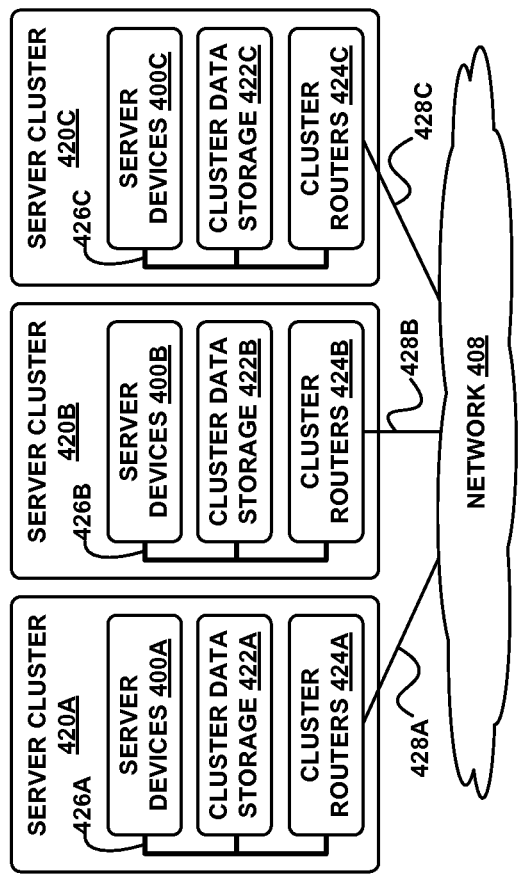
FIG. 4B depicts a cloud-based server system, in accordance with an example embodiment.

FIG. 4B depicts an example of a cloud-based server cluster. In FIG. 4B, functions of server device 310 and server data storage device 312 may be distributed among three server clusters 420A, 420B, and 420C. Server cluster 420A may include one or more server devices 400A, cluster data storage 422A, and cluster routers 424A connected by a local cluster network 426A. Similarly, server cluster 420B may include one or more server devices 400B, cluster data storage 422B, and cluster routers 424B connected by a local cluster network 426B. Likewise, server cluster 420C may include one or more server devices 300C, cluster data storage 422C, and cluster routers 424C connected by a local cluster network 426C. Server clusters 420A, 420B, and 420C may communicate with network 308 via communication links 428A, 428B, and 428C, respectively.

In some embodiments, each of the server clusters 420A, 420B, and 420C may have an equal number of server devices, an equal number of cluster data storages, and an equal number of cluster routers. In other embodiments, however, some or all of the server clusters 420A, 420B, and 420C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 420A, for example, server devices 400A can be configured to perform various computing tasks of a server, such as server device 310. In one embodiment, these computing tasks can be distributed among one or more of server devices 400A. Server devices 400B and 400C in server clusters 420B and 420C may be configured the same or similarly to server devices 400A in server cluster 420A. On the other hand, in some embodiments, server devices 400A, 400B, and 400C each may be configured to perform different functions. For example, server devices 400A may be configured to perform one or more functions of server device 310, and server devices 400B and server device 400C may be configured to perform functions of one or more other server devices. Similarly, the functions of server data storage device 312 can be dedicated to a single server cluster, or spread across multiple server clusters.

Cluster data storages 422A, 422B, and 422C of the server clusters 420A, 420B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 310 and server data storage device 312 can be distributed across server clusters 420A, 420B, and 420C, various active portions and/or backup/redundant portions of these components can be distributed across cluster data storages 422A, 422B, and 422C. For example, some cluster data storages 422A, 422B, and 422C may be configured to store backup versions of data stored in other cluster data storages 422A, 422B, and 422C.

Cluster routers 424A, 424B, and 424C in server clusters 420A, 420B, and 420C, respectively, may include networking equipment configured to provide internal and external communications for the server clusters. For example, cluster routers 424A in server cluster 420A may include one or more packet-switching and/or routing devices configured to provide (i) network communications between server devices 400A and cluster data storage 422A via cluster network 426A, and/or (ii) network communications between the server cluster 420A and other devices via communication link 428A to network 408. Cluster routers 424B and 424C may include network equipment similar to cluster routers 424A, and cluster routers 424B and 424C may perform networking functions for server clusters 420B and 420C that cluster routers 424A perform for server cluster 420A.

Additionally, the configuration of cluster routers 424A, 424B, and 424C can be based at least in part on the data communication requirements of the server devices and cluster storage arrays, the data communications capabilities of the network equipment in the cluster routers 424A, 424B, and 424C, the latency and throughput of the local cluster networks 426A, 426B, 426C, the latency, throughput, and cost of the wide area network connections 428A, 428B, and 428C, and/or other factors that may contribute to the cost, speed, fault-tolerance, resiliency, efficiency and/or other design goals of the system architecture.

c. Example Client Device

Figure 5:
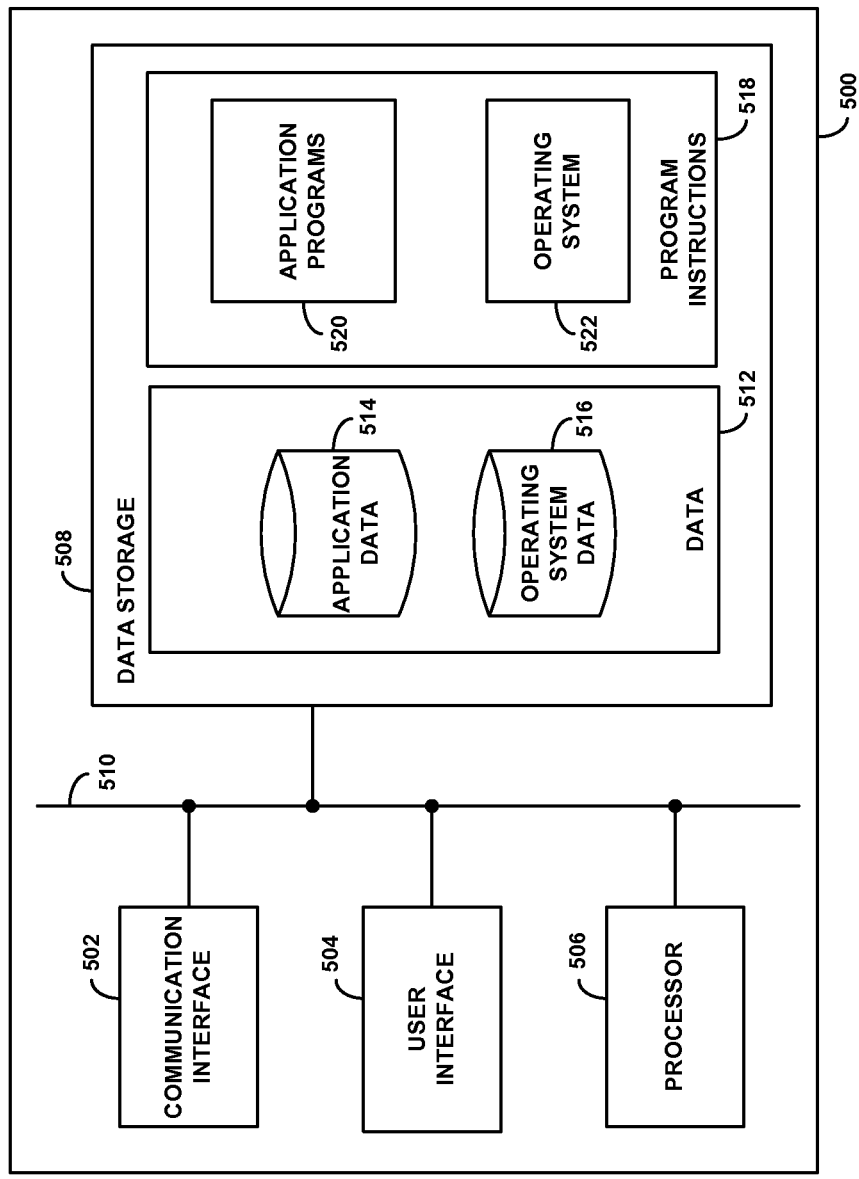
FIG. 5 depicts a block diagram of a client device, in accordance with an example embodiment.

FIG. 5 is a simplified block diagram showing some of the components of an example client device 500. By way of example and without limitation, client device 500 may be or include a "plain old telephone system" (POTS) telephone, a cellular mobile telephone, a still camera, a video camera, a fax machine, an answering machine, a computer (such as a desktop, notebook, or tablet computer), a personal digital assistant, a wearable computing device, a home automation component, a digital video recorder (DVR), a digital TV, a remote control, or some other type of device equipped with one or more wireless or wired communication interfaces.

As shown in FIG. 5, client device 500 may include a communication interface 502, a user interface 504, a processor 506, and data storage 508, all of which may be communicatively linked together by a system bus, network, or other connection mechanism 510.

Communication interface 502 functions to allow client device 500 to communicate, using analog or digital modulation, with other devices, access networks, and/or transport networks. Thus, communication interface 502 may facilitate circuit-switched and/or packet-switched communication, such as POTS communication and/or IP or other packetized communication. For instance, communication interface 502 may include a chipset and antenna arranged for wireless communication with a radio access network or an access point. Also, communication interface 502 may take the form of a wireline interface, such as an Ethernet, Token Ring, or USB port. Communication interface 502 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 502. Furthermore, communication interface 502 may comprise multiple physical communication interfaces (e.g., a Wifi interface, a BLUETOOTH® interface, and a wide-area wireless interface).

User interface 504 may function to allow client device 500 to interact with a human or non-human user, such as to receive input from a user and to provide output to the user. Thus, user interface 504 may include input components such as a keypad, keyboard, touch-sensitive or presence-sensitive panel, computer mouse, trackball, joystick, microphone, still camera and/or video camera. User interface 504 may also include one or more output components such as a display screen (which, for example, may be combined with a touch-sensitive panel), CRT, LCD, LED, a display using DLP technology, printer, light bulb, and/or other similar devices, now known or later developed. User interface 504 may also be configured to generate audible output(s), via a speaker, speaker jack, audio output port, audio output device, earphones, and/or other similar devices, now known or later developed. In some embodiments, user interface 504 may include software, circuitry, or another form of logic that can transmit data to and/or receive data from external user input/output devices. Additionally or alternatively, client device 500 may support remote access from another device, via communication interface 502 or via another physical interface (not shown).

Processor 506 may comprise one or more general purpose processors (e.g., microprocessors) and/or one or more special purpose processors (e.g., DSPs, GPUs, FPUs, network processors, or ASICs). Data storage 508 may include one or more volatile and/or non-volatile storage components, such as magnetic, optical, flash, or organic storage, and may be integrated in whole or in part with processor 506. Data storage 508 may include removable and/or non-removable components.

In general, processor 506 may be capable of executing program instructions 518 (e.g., compiled or non-compiled program logic and/or machine code) stored in data storage 508 to carry out the various functions described herein. Data storage 508 may include a non-transitory computer-readable medium, having stored thereon program instructions that, upon execution by client device 500, cause client device 500 to carry out any of the methods, processes, or functions disclosed in this specification and/or the accompanying drawings. The execution of program instructions 518 by processor 506 may result in processor 506 using data 512.

By way of example, program instructions 518 may include an operating system 522 (e.g., an operating system kernel, device driver(s), and/or other modules) and one or more application programs 520 (e.g., address book, email, web browsing, social networking, and/or gaming applications) installed on client device 500. Similarly, data 512 may include operating system data 516 and application data 514. Operating system data 516 may be accessible primarily to operating system 522, and application data 514 may be accessible primarily to one or more of application programs 520. Application data 514 may be arranged in a file system that is visible to or hidden from a user of client device 500.

Application programs 520 may communicate with operating system 512 through one or more application programming interfaces (APIs). These APIs may facilitate, for instance, application programs 520 reading and/or writing application data 514, transmitting or receiving information via communication interface 502, receiving or displaying information on user interface 504, and so on.

In some vernaculars, application programs 520 may be referred to as "apps" for short. Additionally, application programs 520 may be downloadable to client device 500 through one or more online application stores or application markets. However, application programs can also be installed on client device 500 in other ways, such as via a web browser or through a physical interface (e.g., a USB port) on client device 500.

4. Example System and Operation a. Example Text-to-Speech System

A TTS synthesis system (or more generally, a speech synthesis system) may operate by receiving an input text string, processing the text string into a symbolic representation of the phonetic and linguistic content of the text string, generating a sequence of speech features corresponding to the symbolic representation, and providing the speech features as input to a speech synthesizer in order to produce a spoken rendering of the input text string. The symbolic representation of the phonetic and linguistic content of the text string may take the form of a sequence of labels, each label identifying a phonetic speech unit, such as a phoneme, and further identifying or encoding linguistic and/or syntactic context, temporal parameters, and other information for specifying how to render the symbolically-represented sounds as meaningful speech in a given language. While the term "phonetic transcription" is sometimes used to refer to such a symbolic representation of text, the term "enriched transcription" introduced above will instead be used herein, in order to signify inclusion of extra-phonetic content, such as linguistic and/or syntactic context and temporal parameters, represented in the sequence of labels.

The enriched transcription provides a symbolic representation of the phonetic and linguistic content of the text string as rendered speech, and can be represented as a sequence of phonetic speech units identified according to labels, which could further identify or encode linguistic and/or syntactic context, temporal parameters, and other information for specifying how to render the symbolically-represented sounds as meaningful speech in a given language. As discussed above, the phonetic speech units could be phonemes. A phoneme may be considered to be the smallest segment of speech of given language that encompasses a meaningful contrast with other speech segments of the given language. Thus, a word typically includes one or more phonemes. For purposes of simplicity, phonemes may be thought of as utterances of letters, although this is not a perfect analogy, as some phonemes may present multiple letters. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Other languages may be described by different phonemic alphabets containing different phonemes.

The phonetic properties of a phoneme in an utterance can depend on, or be influenced by, the context in which it is (or is intended to be) spoken. For example, a "triphone" is a triplet of phonemes in which the spoken rendering of a given phoneme is shaped by a temporally-preceding phoneme, referred to as the "left context," and a temporally-subsequent phoneme, referred to as the "right context." Thus, the ordering of the phonemes of English-language triphones corresponds to the direction in which English is read. Other phoneme contexts, such as quinphones, may be considered as well.

Speech features represent acoustic properties of speech as parameters, and in the context of speech synthesis, may be used for driving generation of a synthesized waveform corresponding to an output speech signal. Generally, features for speech synthesis account for three major components of speech signals, namely spectral envelopes that resemble the effect of the vocal tract, excitation that simulates the glottal source, and prosody that describes pitch contour ("melody") and tempo (rhythm). In practice, features may be represented in multidimensional feature vectors that correspond to one or more temporal frames. One of the basic operations of a TTS synthesis system is to map an enriched transcription (e.g., a sequence of labels) to an appropriate sequence of feature vectors.

In the context of speech recognition, features may be extracted from a speech signal (e.g., a voice recording) in a process that typically involves sampling and quantizing an input speech utterance within sequential temporal frames, and performing spectral analysis of the data in the frames to derive a vector of features associated with each frame. Each feature vector can thus be viewed as providing a snapshot of the temporal evolution of the speech utterance.

By way of example, the features may include Mel Filter Cepstral (MFC) coefficients. MFC coefficients may represent the short-term power spectrum of a portion of an input utterance, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.)

In some embodiments, a feature vector may include MFC coefficients, first-order cepstral coefficient derivatives, and second-order cepstral coefficient derivatives. For example, the feature vector may contain 13 coefficients, 13 first-order derivatives ("delta"), and 13 second-order derivatives ("delta-delta"), therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance (or more generally of an audio input signal).

In accordance with example embodiments of HMM-based speech synthesis, a sequence of labels corresponding to enriched transcription of the input text may be treated as observed data, and a sequence of HMMs and HMM states is computed so as to maximize a joint probability of generating the observed enriched transcription. The labels of the enriched transcription sequence may identify phonemes, triphones, and/or other phonetic speech units. In some HMM-based techniques, phonemes and/or triphones are represented by HMMs as having three states corresponding to three temporal phases, namely beginning, middle, and end. Other HMMs with a different number of states per phoneme (or triphone, for example) could be used as well. In addition, the enriched transcription may also include additional information about the input text string, such as time or duration models for the phonetic speech units, linguistic context, and other indicators that may characterize how the output speech should sound, for example.

In accordance with example embodiments, speech features corresponding to HMMs and HMM states may be represented by multivariate PDFs for jointly modeling the different features that make up the feature vectors. In particular, multivariate Gaussian PDFs can be used to compute probabilities of a given state emitting or generating multiple dimensions of features from a given state of the model. Each dimension of a given multivariate Gaussian PDF could thus correspond to different feature. It is also possible to model a feature along a given dimension with more than one Gaussian PDF in that dimension. In such an approach, the feature is said to be modeled by a mixture of Gaussians, referred to a "Gaussian mixture model" or "GMM." The sequence of features generated by the most probable sequence of HMMs and HMM states can be converted to speech by a speech synthesizer, for example.

Figure 6:
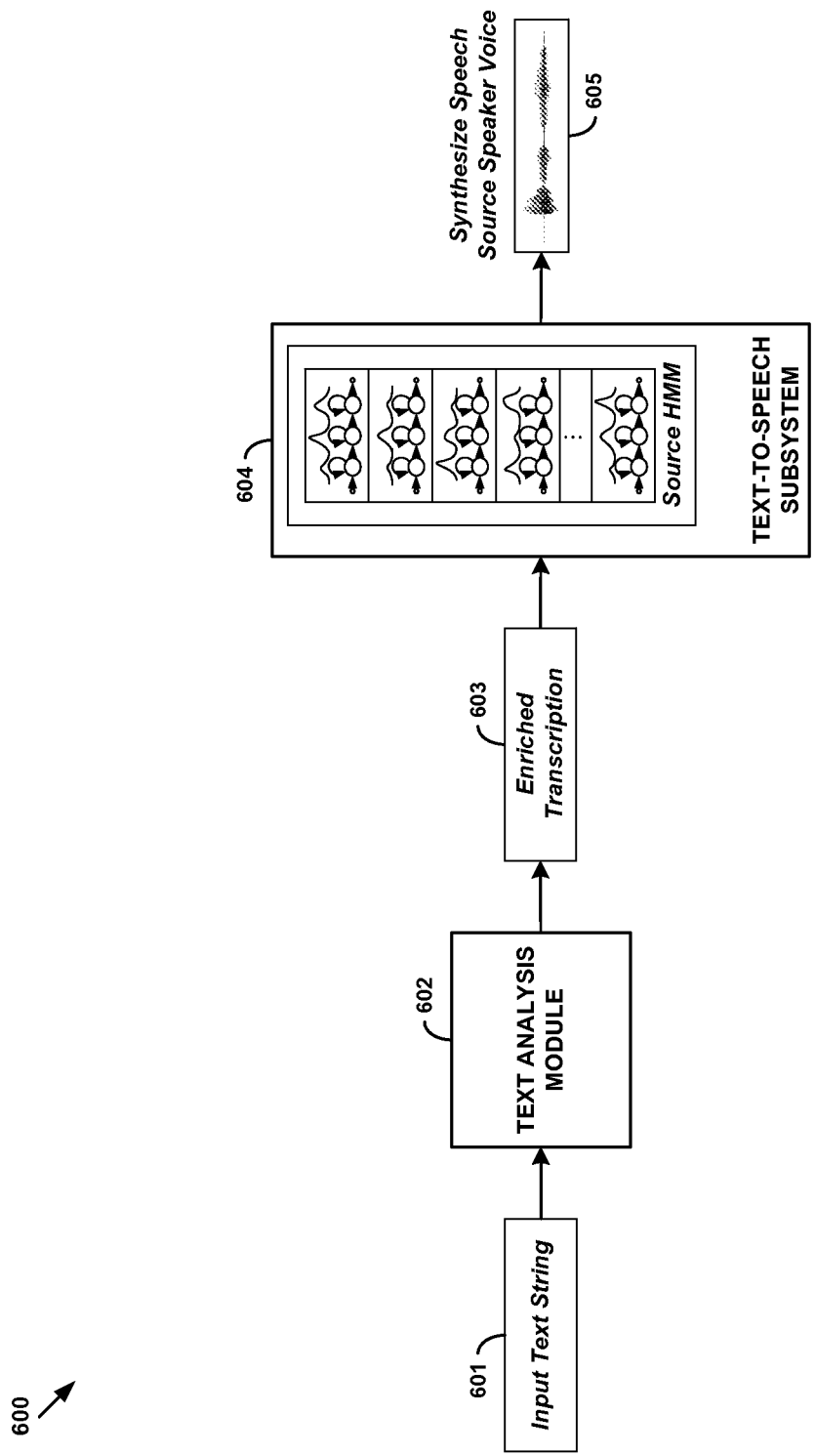
FIG. 6 depicts a simplified block diagram of an example text-to-speech system, in accordance with an example embodiment.

FIG. 6 depicts a simplified block diagram of an example text-to-speech (TTS) synthesis system, in accordance with an example embodiment. In addition to functional components, FIG. 6 also shows selected example inputs, outputs, and intermediate products of example operation. The functional components of the TTS synthesis system 600 include a text analysis module 602 converting text in an enriched transcription, and a TTS subsystem 604, including a source HMM, for generating synthesized speech from the enriched transcription. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other TTS system arrangements, including different components, different relationships between the components, and/or different processing, may be possible.

In accordance with example embodiments, the text analysis module 602 may receive an input text string 601 (or other form of text-based input) and generate an enriched transcription 603 as output. The input text string 601 could be a text message, email, chat input, or other text-based communication, for example. As described above, the enriched transcription could correspond to a sequence of labels that identify speech units, including context information.

As shown, the TTS subsystem 604 may be employ HMM-based speech synthesis to generate feature vectors corresponding to the enriched transcription 603. This is illustrated in FIG. 6 by a symbolic depiction of a source HMM in the TTS subsystem 604. The source HMM is represented by a configuration of speech-unit HMMs, each corresponding to a phonetic speech unit of the input language. The phonetic units could be phonemes or triphones, for example. Each speech-unit HMM is drawn as a set of circles, each representing a state of the speech unit, and arrows connecting the circles, each arrow representing a state transition. A circular arrow at each state represents a self-transition. Above each circle is a symbolic representation of a PDF. In the HMM methodology, the PDF specifies the probability that a given state will "emit" or generate speech features corresponding to the speech unit modeled by the state. The depiction in the figure of three states per speech-unit HMM is consistent with some HMM techniques that model three states for each speech unit. However, HMM techniques using different numbers of states per speech units may be employed as well, and the illustrative use of three states in FIG. 6 (as well as in other figures herein) is not intended to be limiting with respect to example embodiments described herein. Further details of an example TTS synthesis system are described below.

In the example of FIG. 6, the TTS subsystem 604 outputs synthesized speech 605 in a voice of a source speaker. The source speaker could be a speaker used to train the source HMM.

In further accordance with example embodiments, the HMMs of a HMM-based TTS synthesis system may be trained by tuning the PDF parameters, using a database of text recorded speech and corresponding known text strings.

Figure 7:
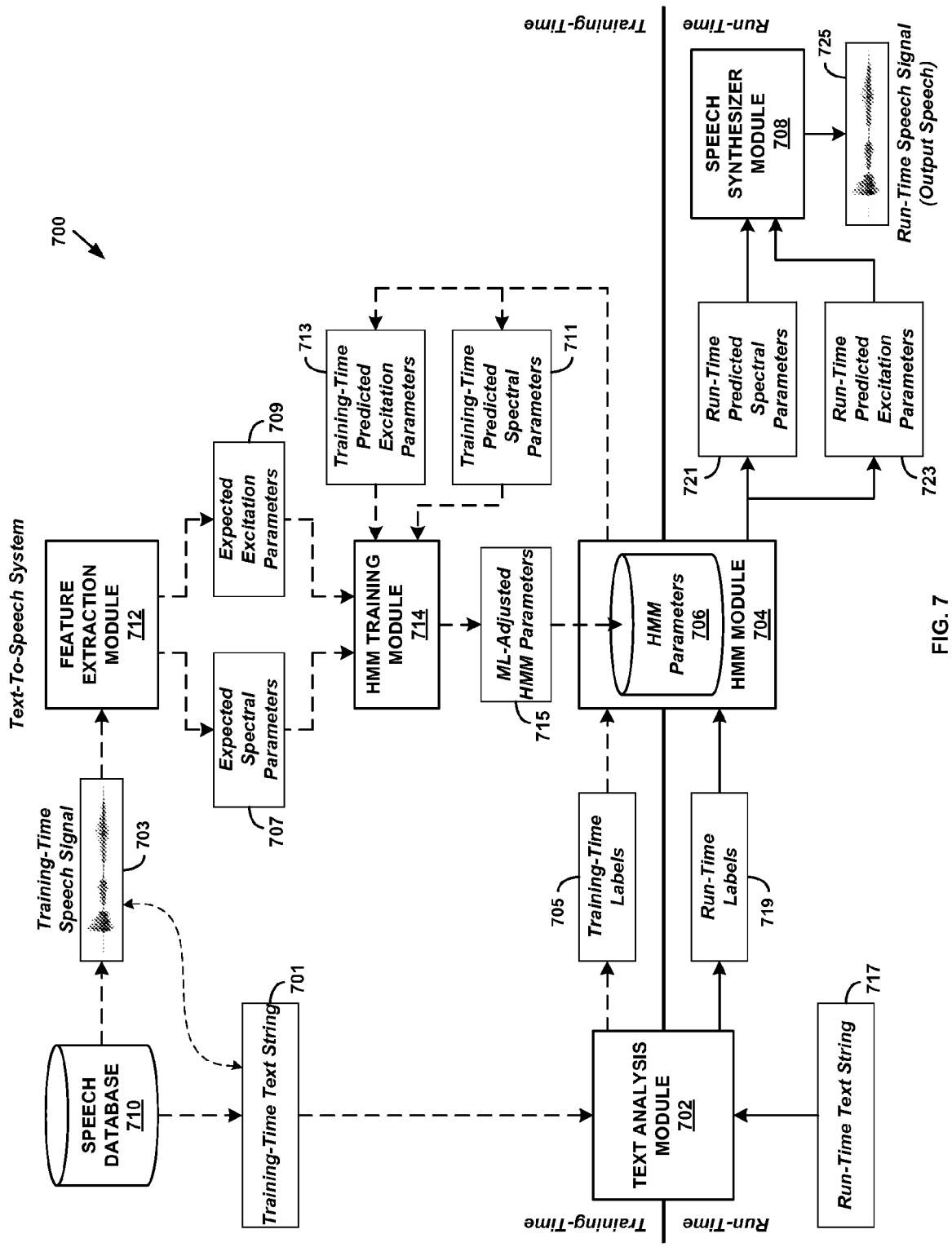
FIG. 7 is a block diagram depicting additional details of an example text-to-speech speech system, in accordance with an example embodiment.

FIG. 7 is a block diagram depicting additional details of an example text-to-speech speech system, in accordance with an example embodiment. As with the illustration in FIG. 6, FIG. 7 also displays functional components and selected example inputs, outputs, and intermediate products of example operation. The functional components of the speech synthesis system 700 include a text analysis module 702, a HMM module 704 that includes HMM parameters 706, a speech synthesizer module 708, a speech database 710, a feature extraction module 712, and a HMM training module 714. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

For purposes of illustration, FIG. 7 is depicted in a way that represents two operational modes: training-time and run-time. A thick, horizontal line marks a conceptual boundary between these two modes, with "Training-Time" labeling a portion of FIG. 7 above the line, and "Run-Time" labeling a portion below the line. As a visual cue, various arrows in the figure signifying information and/or processing flow and/or transmission are shown as dashed lines in the "Training-Time" portion of the figure, and as solid lines in the "Run-Time" portion.

During training, a training-time text string 701 from the speech database 710 may be input to the text analysis module 702, which then generates training-time labels 705 (an enriched transcription of the training-time text string 701). Each training-time label could be made up of a phonetic label identifying a phonetic speech unit (e.g., a phoneme), context information (e.g., one or more left-context and right-context phoneme labels, physical speech production characteristics, linguistic context, etc.), and timing information, such as a duration, relative timing position, and/or phonetic state model.

The training-time labels 705 are then input to the HMM module 704, which models training-time predicted spectral parameters 711 and training-time predicted excitation parameters 713. These may be considered speech features that are generated by the HMM module according to state transition probabilities and state emission probabilities that make up (at least in part) the HMM parameters. The training-time predicted spectral parameters 711 and training-time predicted excitation parameters 713 are then input to the HMM training module 714, as shown.

In further accordance with example embodiments, during training a training-time speech signal 703 from the speech database 710 is input to the feature extraction module 712, which processes the input signal to generate expected spectral parameters 707 and expected excitation parameters 709. The training-time speech signal 703 is predetermined to correspond to the training-time text string 701; this is signified by a wavy, dashed double arrow between the training-time speech signal 703 and the training-time text string 701. In practice, the training-time speech signal 701 could be a speech recording of a speaker reading the training-time text string 703. More specifically, the corpus of training data in the speech database 710 could include numerous recordings of one or more speakers reading numerous text strings. The expected spectral parameters 707 and expected excitation parameters 709 may be considered known parameters, since they are derived from a known speech signal.

During training time, the expected spectral parameters 707 and expected excitation parameters 709 are provided as input to the HMM training module 714. By comparing the training-time predicted spectral parameters 711 and training-time predicted excitation parameters 713 with the expected spectral parameters 707 and expected excitation parameters 709, the HMM training module 714 can determine how to adjust the HMM parameters 706 so as to achieve closest or optimal agreement between the predicted results and the known results. While this conceptual illustration of HMM training may appear suggestive of a feedback loop for error reduction, the procedure could entail a maximum likelihood (ML) adjustment of the HMM parameters. This is indicated by the return of ML-adjusted HMM parameters 715 from the HMM training module 714 to the HMM parameters 706. In practice, the training procedure may involve many iterations over many different speech samples and corresponding text strings in order to cover all (or most) of the phonetic speech units of the language of the TTS speech synthesis system 700 with sufficient data to determine accurate parameter values.

During run-time operation, illustrated in the lower portion of FIG. 7 (below thick horizontal line), a run-time text string 717 is input to the text analysis module 702, which then generates run-time labels 719 (an enriched transcription of the run-time text string 717). The form of the run-time labels 719 may be the same as that for the training-time labels 705. The run-time labels 719 are then input to the HMM module 704, which generates run-time predicted spectral parameters 721 and run-time predicted excitation parameters 723, again according to the HMM-based technique.

The run-time predicted spectral parameters 721 and run-time predicted excitation parameters 723 can generated in pairs, each pair corresponding to a predicted pair of feature vectors for generating a temporal frame of waveform data.

In accordance with example embodiments, the run-time predicted spectral parameters 721 and run-time predicted excitation parameters 723 may next be input to the speech synthesizer module 708, which may then synthesize a run-time speech signal 725. As an example, speech synthesize could include a vocoder that can translate the acoustic features of the input into an output waveform suitable for playout on an audio output device, and/or for analysis by a signal measuring device or element. Such a device or element could be based on signal measuring hardware and/or machine language instructions that implement an analysis algorithm. With sufficient prior training, the run-time speech signal 725 may have a high likelihood of being an accurate speech rendering of the run-time text string 717.

b. Non-Parametric HMM-Based Voice Conversion

Returning for the moment to the TTS synthesis system 600 of FIG. 6, the source HMM in the TTS subsystem 602 may be considered to be a configuration of HMM state models for modeling speech in a voice of a source speaker. In particular, the multivariate Gaussian PDFs for modeling features of each state may be determined by way of training using recordings (or other speech signals) of a source speaker.

With the arrangement shown in FIG. 6, the TTS synthesis system 600 may convert an input text string 601 at run-time into an output utterance 605 spoken in a voice modeled by the source HMM. In general, the source voice may be different than that of a user who creates or provides the input text string at run-time. While a user's interaction with, or use of, a TTS system such as the one illustrated in FIGS. 6 and/or 7 may not necessarily involve speaking (at least when creating or providing text-based input), it may be assumed that such a user has a speaking voice. Accordingly the term "target speaker" will be used herein to designate a user who provides or generates text-based input to a TTS synthesis system, even if no actual speaking is involved in the process providing text-based input. It is also possible that the target speaker is a virtual user instantiated by an executable program or application. In accordance with example embodiments, a TTS synthesis system (or, more generally, a speech synthesis system) can employ a technique entailing non-parametric voice conversion for HMM-based speech synthesis in order to synthesize speech that sounds like the voice a target speaker.

Figure 8:
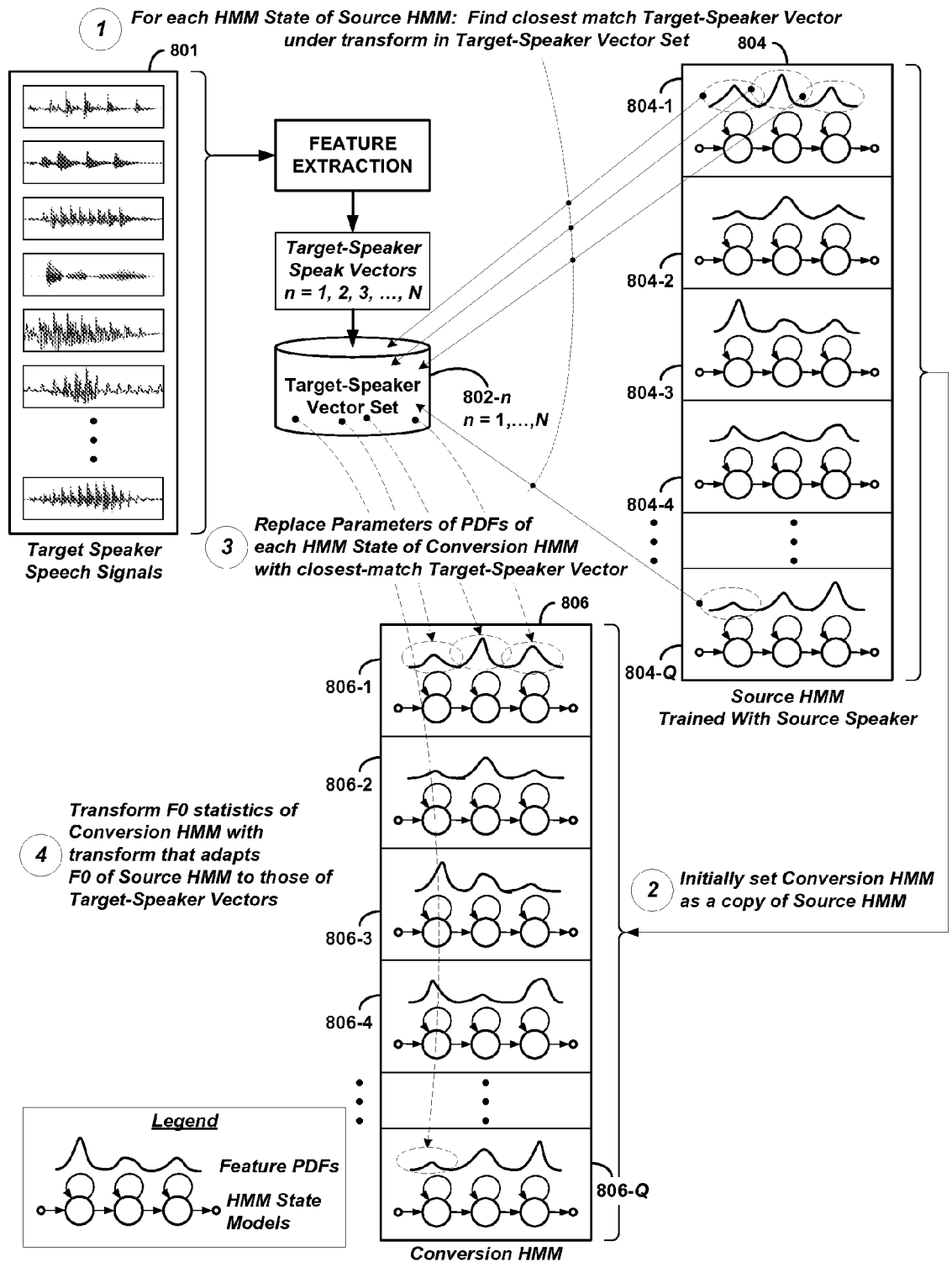
FIG. 8 is a schematic illustration of configuring a hidden Markov model for non-parametric voice conversion, in accordance with an example embodiment.

Example operation of non-parametric voice conversion for HMM-based speech synthesis is illustrated conceptually in FIG. 8. As shown, speech parameters may be extracted from target speaker speech signals 801 in a feature extraction process, yielding n=1, 2, 3, . . . , N target-speaker vectors. The target-speaker vectors may be considered as forming a target-speaker vector set 802-1, 802-2, 802-3, . . . , 802-N, which could be stored in a file or database, for example. In analytic terms, the target-speaker vector set may be said to form a vector space. The target speaker speech signals, represented graphically in the figure as plots of waveforms, could be speech recordings of the target speaker.

FIG. 8 also depicts a source HMM 804 that includes a configuration of Q HMM state models 804-1, 804-2, 804-3, 804-4, . . . , 804-Q. As indicated, the source HMM 804 may be trained using recordings (or other speech waveforms) of a source speaker. The source HMM 804 could be used, for example, in a TTS synthesis system, such as the one illustrated in FIG. 6. Note that N may not, in general, be equal to Q, although the possibility of equality is not necessarily excluded.

As indicated in the legend at the bottom left of FIG. 8, each HMM state model in FIG. 8 is represented pictorially as a sequence of three states (shown as circles) connected by arrows representing state transitions; each state has a self-transition represented by a circular arrow. A symbolic PDF is shown above each state. The particular forms of the PDFs, as well as the representation of three states per HMM state model is intended to be illustrative, and not necessarily limiting with respect to embodiments herein.

In accordance with example embodiments, the PDFs of the HMM state models of the source HMM 804 may include multivariate Gaussian PDFs for jointly modeling spectral envelope parameters, and multivariate Gaussian PDFs for jointly modeling excitation parameters. Although this detail of the PDFs is not necessarily shown explicitly in the pictorial representation of the HMM states in FIG. 8, it may be assumed in references to PDFs in the discussions below. It should also be noted, however, that other forms of PDFs may be used in statistical modeling of speech, including in other HMM-based techniques.

In accordance with example embodiments, a matching procedure is carried out to determine a best match to each state model of the source HMM 804 from among the target-speaker vector set 802-1, 802-2, 802-3, . . . , 802-N. The matching procedure is indicated in descriptive text, enumerated as step 1 in FIG. 8, and illustrated conceptually by a respective arrow pointing from just four example HMM states of the source HMM 804 to the target-speaker vector set 802-1, 802-2, 802-3, . . . , 802-N. A similar search may be performed for all of the other HMM state models of the output HMM 804. However, only four are depicted for the sake of brevity in the figure. As described in more detail below, the matching procedure is involves a matching under transform technique that compensates for differences between the source speaker and the target speaker.

In further accordance with example embodiments, a mapping HMM, referred to herein as a "conversion" HMM 806, is constructed. As indicated by the descriptive text enumerated as step 2 in FIG. 8, the converted HMM is initially just a copy of the source HMM. The converted HMM 806 thus includes a configuration of Q HMM state models 806-1, 806-2, 806-3, 806-4, . . . , 806-Q, as shown. These are initially identical to the Q HMM state models of the source HMM 804.

Following initial construction of the converted HMM 806, the parameters of each of its state models is replaced by a particular target-speaker vector from the target-speaker vector set 802-1, 802-2, 802-3, . . . , 802-N determined to be the closest match to the corresponding state model of the source HMM 804. The replacement operation is indicated in descriptive text, enumerated as step 3 in FIG. 8, and displayed pictorially by curved, dashed arrows from the target-speaker vector set 802-1, 802-2, 802-3, . . . , 802-N to representative HMM states of the converted HMM 806. A replacement may be performed for all of the HMM state models of the converted HMM 806, although for the sake of brevity in the figure, only four curved, dashed arrows representing replacements are shown explicitly.

After each of the HMM states of the initially constructed converted HMM 806 have been replaced by the best matches from the target-speaker vector set 802-1, 802-2, 802-3, . . . , 802-N, the converted HMM 806 is then speech adapted to other characteristics of the target speaker not necessarily represented in the target-speaker vectors. More specifically, an F0 transform may be computed that adapts statistics of F0 of the source HMM 804 to the F0 statistics of the target speaker. The adaptation can be made to match up to first order statistics (means), second order statistics (means and variances), or higher (e.g., matching PDFs). The adaptation can be made directly on values of F0, or on the means of Gaussian states of the HMMs.

The computed F0 transform can be applied to the converted HMM 806 to adapt the F0 statistics of the converted HMM 806 to the F0 statistics of the target speaker. For example, the means of the Gaussian states of the converted HMM 806 may be transformed in this way. This adaptation operation is indicated by as step 4 in descriptive text in FIG. 8. The converted HMM 806 can then be used in a TTS synthesis system, in place of the source HMM. Synthesized speech could then sound like, or have characteristics of, the target speaker's voice.

In accordance with example embodiments, the operations illustrated by way of example in FIG. 8 could be carried out offline or otherwise prior to run-time application of a TTS synthesis system. In this way, a TTS synthesis system could be prepared for use by multiple run-time users (or target speakers), and for multiple configurations of voice conversion.

Figure 9:
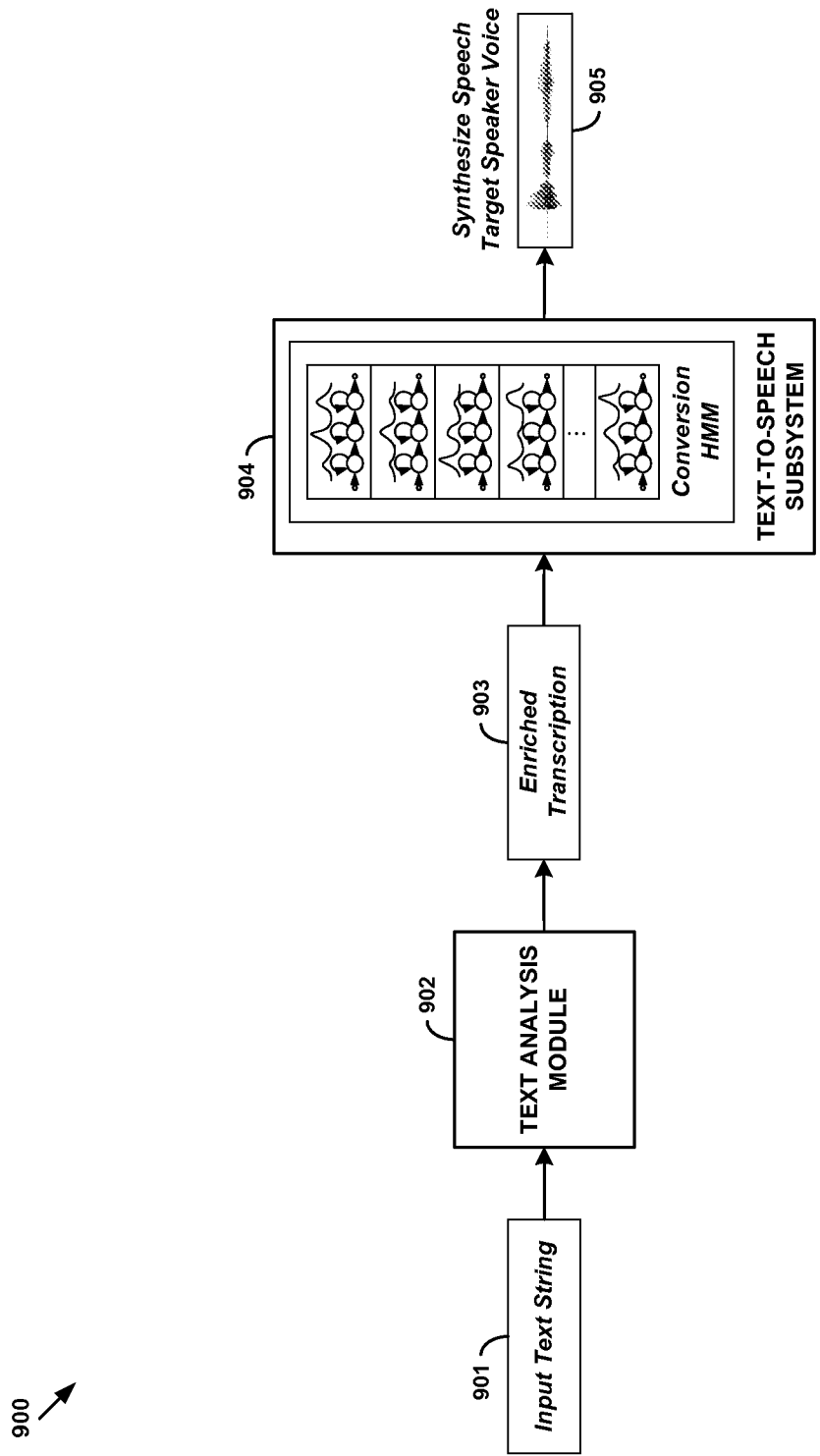
FIG. 9 depicts a block diagram of an example text-to-speech system configured for non-parametric voice conversion, in accordance with an example embodiment.

FIG. 9 depicts a block diagram of an example TTS synthesis system 900 that implements non-parametric voice conversion, in accordance with an example embodiment. The TTS synthesis system 900 is similar to the TTS synthesis system 600 shown in FIG. 6, except that a converted HMM configured as described above is used for generating speech features for speech synthesis. The functional components of the TTS synthesis system 900 include a text analysis module 902 converting text in an enriched transcription, and a TTS subsystem 904, including a converted HMM, for generating synthesized speech from the enriched transcription. In selected example inputs, outputs, and intermediate products of example operation are also depicted.

Operation of the TTS synthesis system 900 is largely the same that described for the TTS synthesis system 600, except that the TTS synthesis system 900 performs voice conversion that causes the output voice of the TTS subsystem 904 to sound like the voice of the target speaker. More specifically, n text string 901 generated and/or provided by a target speaker may be received by the text analysis module 902, which then generates an enriched transcription 903 as output. As in the example in FIG. 6, the input text string 901 could be a text message, email, chat input, or other text-based communication, for example, and the enriched transcription could correspond to a sequence of labels that identify speech units, including context information.

In accordance with example embodiments, the TTS subsystem 904 may then employ the converted HMM to generate feature vectors corresponding to the enriched transcription 903. Finally, the TTS subsystem 904 can output synthesized speech 905 in a voice of a target speaker.

As described above, and in accordance with example embodiments, the HMM states of the converted HMM are initially the same as those of the source HMM are replaced by target-speaker vectors that are selected for being closest matches to HMM states of the source HMM. The matching operation is carried out under a transform that compensates for differences between the source speaker used to train the source HMM and the target speaker. Further details of the matching under transform technique are described below.

c. Matching Under Transform

In general terms, voice conversion is concerned with converting the voice of a source speaker to the voice of a target speaker. For purposes of the discussion herein, the target speaker is designated X, and the source speaker is designated Y. These designations are intended for convenience of discussion, and other designations could be used. In the context of speech modeling (e.g., recognition and/or synthesis), feature analysis of speech samples of speaker X could generate a vector space of speech features, designated X-space. Similarly, feature analysis of speech samples of speaker Y could generate a vector space of speech features, designated Y-space. For example, feature vectors could correspond to parameterizations of spectral envelopes and/or excitation, as discussed above. In general, X-space and Y-space may be different. For example, they could have a different number of vectors and/or different parameters. Further, they could correspond to different languages, be generated using different feature extraction techniques, and so on.

Matching under transform may be considered a technique for matching the X-space and Y-space vectors under a transform that compensates for differences between speakers X and Y. It may be described in algorithmic terms as a computational method, and can be implemented as machine-readable instructions executable by the one or more processors of a computing system, such as a TTS synthesis system. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

By way of example, X-space may be taken to include N vectors, designated $\vec{x}_n$, n=1, . . . , N. Similarly, Y-space may be taken to include Q vectors, designated $\vec{y}_q$, q=1, . . . , Q. As noted, N and Q may not necessarily be equal, although the possibility that they are is not precluded. In the context of speech modeling, N and Q could correspond to a number of samples from speakers X and Y, respectively.

In accordance with example embodiments, matching under transform (MUT) uses a transformation function $\vec{y}$F$(\vec{x})$ to convert X-space vectors to Y-space vectors, and applies a matching-minimization (MM) operation within a deterministic annealing framework to match each Y-space vector with one X-space vector. The transformation function defines a parametric mapping from X-space to Y-space. At the same time, a non-parametric, association mapping from Y-space to X-space may be defined in terms of conditional probabilities. Specifically, for a given X-space vector $\vec{x}_n$ and a given Y-space vector $\vec{y}_q$, an "association probability" $p(\vec{x}_n|\vec{y}_q)$ may be used to specify a probability that $\vec{y}_q$ maps to $\vec{x}_n$. In this way, MUT involves bi-directional mapping between X-space and Y-space: parametric in a "forward direction" (X→Y) via F(•), and non-parametric in the "backward direction" (Y→X) via $p(\vec{x}_n|\vec{y}_q)$.

A goal of MUT is to determine which X-space vectors $\vec{x}_n$ correspond to a Y-space $\vec{y}_q$ vector in the sense that $F(\vec{x})$ is close $\vec{y}_q$ in L2-norm, and under the circumstance that $F(\vec{x})$ and the probabilities $p(\vec{x}_n|\vec{y}_q)$ are not known ahead of time. Rather than searching for every possible mapping between X-space and Y-space vectors, a distortion metric between $\vec{x}_n$ and $\vec{y}_q$ may be defined as:

$$d(\vec{y}_q, \vec{x}_n) = (\vec{y}_q - F(\vec{x}_n))^T W_q (\vec{y}_q - F(\vec{x}_n)), \quad [1]$$

where $W_q$ is a weighting matrix depending on Y-space vector $\vec{y}_q$. Then taking $p(\vec{x}_n|\vec{y}_q)$ to be the joint probability of matching vectors $\vec{y}_q$ and $\vec{x}_n$, an average distortion over all possible vector combinations may be expressed as:

$$D = \Sigma_{n,q} p(\vec{y}_q, \vec{x}_n) d(\vec{y}_q, \vec{x}_n) = \Sigma_q p(\vec{y}_q) \Sigma_n p(\vec{x}_n|\vec{y}_q) d(\vec{y}_q, \vec{x}_n). \quad [2]$$

In the MUT approach, the bi-directional mapping provides a balance between forward and backward mapping, ensuring convergence to a meaningful solution.

Figure 10:
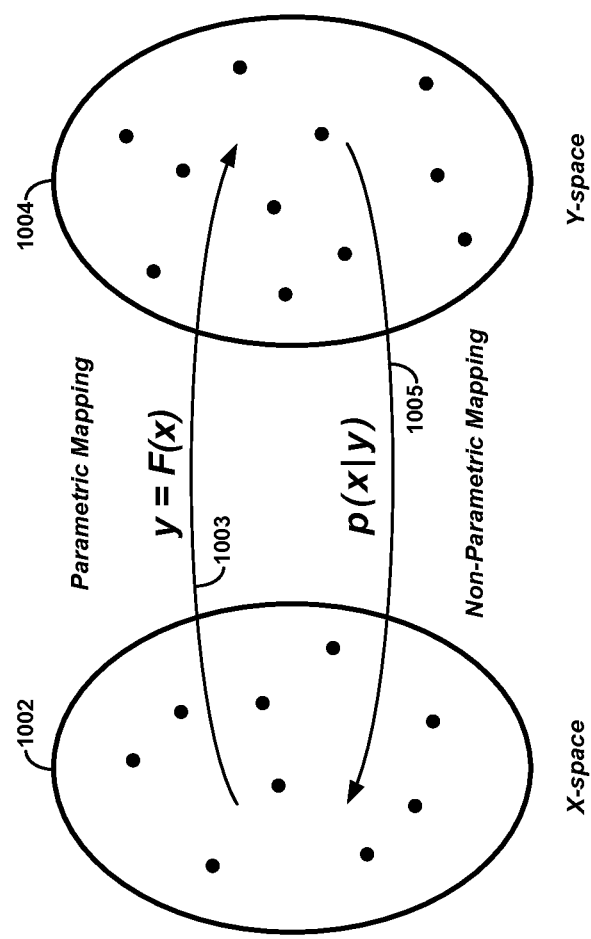
FIG. 10 is a conceptual illustration of parametric and non-parametric mapping between vector spaces, in accordance with an example embodiment.

FIG. 10 is a conceptual illustration of parametric and non-parametric mapping between vector spaces, in accordance with example embodiments. The figure includes an X-space 1002, represented as an oval containing several dots, each dot symbolically representing an X-space vector (e.g., $\vec{x}_n$). Similarly, a Y-space 1004 is represented as an oval containing several dots, each dot symbolically representing an Y-space vector (e.g., $\vec{y}_q$). For purposes of illustration, and by way of example, the two spaces are shown to contain a different number of vectors (dots). An arrow 1003 from X-space to Y-space symbolically represents parametric mapping given by $\vec{y} = F(\vec{x})$. In the opposite direction, an arrow 1005 from Y-space to X-space symbolically represents non-parametric mapping via $p(\vec{x}_n|\vec{y}_q)$.

In accordance with example embodiments, minimizing the average distortion D simultaneously for $F(\vec{x})$ and $p(\vec{x}_n|\vec{y}_q)$ may be achieved using techniques of simulated annealing. Specifically, an uncertainty in probabilistic matching between X-space and Y-space may be accounted for by an "association entropy," which can be expressed as $H(Y,X) = H(Y) + H(X|Y)$. Taking $$p(\vec{y}_q) = \frac{1}{Q}$$

so as to ensure that all Y-space vectors are accounted for equally, it follows that H(Y) is constant. A composite minimization criterion D' may then be defined as:

$$D' = D - \lambda H(X|Y), \quad [3]$$

where the entropy Lagrangian λ corresponds to an annealing temperature.

Minimizing D' with respect to the association probabilities yields the associations. In the general case of λ≠0, the association probabilities may be expressed in the form of a Gibbs distribution and determined in what is referred to algorithmically herein as an "association step." When λ approaches zero, the mapping between Y-space and X-space becomes many to one (many Y-space vectors may be matched to one X-space vector). It can be shown in this case (λ→0) that the association probabilities may be determined from a search for the nearest X-space vector in terms of the distortion metric $d(\vec{y}_q, \vec{x}_n)$, in what is referred to algorithmically herein as a "matching step."

Given the associations determined either by an association step or a matching step, the transform function can be defined and its optimal parameters determined by solving a minimization of D' with respect to the defined form of F(•). This determination of $F(\vec{x})$ is referred to algorithmically herein as a "minimization step."

The purpose of the transform is to compensate for speaker differences between, in this example, speakers X and Y. More specifically, cross-speaker variability can be captured by a linear transform of the form $\vec{\mu}_k + \Sigma_k \vec{x}_n$, where $\vec{\mu}_k$ is a bias vector, and $\Sigma_k$ is linear transformation matrix of the k-th class. The linear transform matrix can compensate for differences in the vocal tract that are related to vocal tract shape and size. Accordingly, $F(\vec{x})$ may be defined as a mixture-of-linear-regressions function defined as:

$$F(\vec{x}_n) = \Sigma_{k=1}^{K} p(k|\vec{x}_n)[\vec{\mu}_k + \Sigma_k \vec{x}_n], \quad [4]$$

where $p(k|\vec{x}_n)$ is the probability that $\vec{x}_n$ belongs to the k-th class.

Assuming a class of probabilities $p(k|\vec{x}_n)$ corresponding to a Gaussian mixture model (GMM), and reformulating $\Sigma_k \vec{x}_n$ using the vector operator vec{•} and the Kronecker delta product to define $\vec{\sigma}_k \equiv \text{vec}\{\Sigma_k\}$, it can be shown that $F(\vec{x})$ may be expressed as:

$$F(\vec{x}_n) = [\Delta_n \quad B_n]\begin{bmatrix}\vec{\mu}\\\vec{\sigma}\end{bmatrix} = \Gamma_n \vec{\gamma}, \quad [5]$$

where $$\Delta_n = [p(k=1|\vec{x}_n)I \quad p(k=2|\vec{x}_n)I \quad \ldots \quad p(k=K|\vec{x}_n)I], \quad [6]$$

$$\vec{\mu} = [\vec{\mu}_1^T \quad \vec{\mu}_2^T \quad \ldots \quad \vec{\mu}_K^T]^T, \quad [7]$$

$$B_n = [p(k=1|\vec{x}_n)X_n \quad p(k=2|\vec{x}_n)X_n \quad \ldots \quad p(k=K|\vec{x}_n)X_n], \quad [8]$$

$$\vec{\sigma} = [\vec{\sigma}_1'^T \quad \vec{\sigma}_2'^T \quad \ldots \quad \vec{\sigma}_K'^T]^T. \quad [9]$$

In the above expressions, I is the identity matrix (appropriately dimensioned), $\vec{\sigma}_k' \equiv \text{vec}\{\Sigma_k'\}$ contains only the free parameters of the structured matrix $\Sigma_k$, and $\Sigma_k \vec{x}_n = X_n \vec{\sigma}_k'$. The optimal $\vec{\gamma}$ can then be obtained by partial differentiation, setting $$\frac{\partial D'}{\partial \vec{\gamma}} = 0.$$

Doing so yields the following unique solution:

$$\vec{\gamma} = -(\Sigma_q p(\vec{y}_q) \Sigma_n p(\vec{x}_n | \vec{y}_q) \Gamma_n^T W_q \Gamma_n)^{-1} (\Sigma_q p(\vec{y}_q) \Sigma_n p(\vec{x}_n | \vec{y}_q) \Gamma_n^T W_q \vec{y}_q). \quad [10]$$

Based on the discussion above, two algorithms may be used to obtain matching under transform. The first is referred to herein as "association-minimization," and the second is referred to herein as "matching-minimization." In accordance with example embodiments, association-minimization may be implemented with the following steps:
1. Initialization.
2. Set λ to high value (e.g., λ=1).
3. Association step.
4. Minimization step.
5. Repeat from step 3 until convergence.
6. Lower λ according to a cooling schedule and repeat from step 3, until λ approaches zero or other target value.

Initialization sets a starting point for MUT optimization, and may differ depending on the speech features used. For conversion of mel-cepstral coefficient (MCEP) parameters, a search for a good vocal-tract length normalization transform with a single linear frequency warping factor may suffice. Empirical evidence suggests that an adequate initialization transform is one that minimizes the distortion in an interval [0.7, 1.3] of frequency warping factor. The association step uses the Gibbs distribution function for the association probabilities, as described above. The minimization step then incorporates the transformation function. Steps 5 and 6 iterate for convergence and cooling.

In further accordance with example embodiments, matching-minimization may be implemented with the following steps:
1. Initialization.
2. Matching step.
3. Minimization step.
4. Repeat from step 2 until convergence.

Initialization is the same as that for association-minimization, starting with a transform that minimizes the distortion in an interval of values of [0.7, 1.3] in frequency warping factor. The matching step uses association probabilities determined from a search for the nearest X-space vector, as described above. The minimization step then incorporates the transformation function. Step 5 iterates for convergence. Note that there is no cooling step, since matching-minimization assumes λ=0.

In certain practical circumstances, matching-minimization may yield comparable results to association-minimization, but at lower computation cost. Accordingly, only matching-minimization is considered below for MUT. It will be appreciated that the techniques discussed below could be generalized for application to association-minimization.

As described above in the context of HMM-based voice conversion, matching under transform may be used for determining the closest matching target-speaker vector to each HMM state of the source HMM. In accordance with example embodiments, this matching may be accomplished by implementing the matching-minimization algorithm described above. For example, as discussed in connection with FIG. 8, for the source HMM discussed above, each Gaussian state jointly models either the spectral envelope parameters and their delta and delta-delta values, or the excitation parameters and their delta and delta-delta values. Similarly, the target-speaker vectors include spectral envelope parameters and excitation parameters of the target speaker, as extracted from speech signals of the target speaker. The matching-minimization algorithm may be applied separately for both spectral envelope parameters and for excitation parameters in order to match Gaussian states of the source HMM and the target-speaker vectors. Since the procedure is largely the same for both spectral envelope parameters and for excitation parameters, no explicit distinction is made between parameter types in relation to the Gaussian states referenced in the discussion below.

For each Gaussian state of the source HMM, a corresponding target-speaker vector that when transformed is nearest to the mean of the Gaussian state in terms of a distance criterion based on mean-squared-error (mse) may be determined as follows. Matching is first initialized by scanning a range of values from 0.7 to 1.3 of linear warping factor that minimizes the overall distortion. This may be accomplished by resampling the relevant parameter (spectral envelope or excitation) at the linearly warped frequency factor. The matching-minimization algorithm may then be run with a single class transform to obtain the matching between the transformed vectors and the means of the HMM-state Gaussians of the source HMM. The single class transform serves to compensate speaker differences. Note that the matching accounts for the means, the deltas, and the delta-deltas as well.

The accuracy of the results of the matching-minimization procedure helps ensure high-quality voice conversion using the converted HMM with the HMM states replaced by those determined from the matching. The matching-minimization procedure may also be implemented efficiently and cost-effectively, thereby contributing to overall scalability of a TTS synthesis system that incorporates voice conversion and may be used by many (e.g., millions of) users.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
   training an source hidden Markov model (HMM) based speech features generator implemented by one or more processors of a system using speech signals of a source speaker, wherein the source HMM based speech features generator comprises a configuration of source HMM state models, each of the source HMM state models having a set of generator-model functions;
   extracting speech features from speech signals of a target speaker to generate a target set of target-speaker vectors;
   for each given source HMM state model of the configuration, determining a particular target-speaker vector from among the target set that most closely matches parameters of the set of generator-model functions of the given source HMM;

determining a fundamental frequency (F0) transform that speech-adapts F0 statistics of the source HMM based speech features generator to match F0 statistics of the speech of the target speaker;

constructing a converted HMM based speech features generator implemented by one or more processors of the system to be the same as the source HMM based speech features generator, but wherein the parameters of the set of generator-model functions of each source HMM state model of the converted HMM based speech features generator are replaced with the determined particular most closely matching target-speaker vector from among the target set; and speech-adapting F0 statistics of the converted HMM based speech features generator using the F0 transform to thereby produce a speech-adapted converted HMM based speech features generator.

2. The method of claim 1, wherein the source HMM based speech features generator, and the converted HMM based speech features generator are implemented by at least one common processor from among the one or more processors of the system.

3. The method of claim 1, further comprising:
creating an enriched transcription of a run-time text string;
using the speech-adapted converted HMM based speech features generator to convert the enriched transcription into corresponding output speech features; and
generating a synthesized utterance of the enriched transcription using the output speech features, the synthesized utterance having voice characteristics of the target speaker.

4. The method of claim 3, wherein the converted HMM based speech features generator is part of a text-to-speech (TTS) system,
wherein creating the enriched transcription of the run-time text string comprises receiving the run-time text string at the TTS system, and converting the received run-time text string into the enriched transcription of the run-time text string by the TTS system,
and wherein generating the synthesized utterance of the enriched transcription using the output speech features comprises synthesizing speech by the TTS system.

5. The method of claim 1, wherein the set of generator-model functions for each given source HMM state model comprises a multivariate spectral probability density function (PDF) for jointly modeling spectral envelope parameters of a phonetic unit modeled by a given source HMM state model, and a multivariate excitation PDF for jointly modeling excitation parameters of the phonetic unit,
and wherein determining for each given source HMM state model the particular target-speaker vector from among the target set that most closely matches parameters of the set of generator-model functions of the given source HMM comprises:
determining a target-speaker vector from among the target set that is computationally nearest to parameters of the multivariate spectral PDF of the given source HMM state model in terms of a distance criterion based on one of mean-squared-error (mse) or Kullback-Leibler distance; and
determining a target-speaker vector from among the target set that is computationally nearest to the multivariate excitation PDF of the given source HMM state model in terms of a distance criterion based on one of mse or Kullback-Leibler distance.

6. The method of claim 5, wherein the multivariate spectral PDF of at least one source HMM state model has the mathematical form of a multivariate Gaussian function.

7. The method of claim 5, wherein the phonetic unit is one of a phoneme or a triphone.

8. The method of claim 5, wherein the spectral envelope parameters of the phonetic unit are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit,
and wherein extracting speech features from speech signals of target the speaker comprises decomposing the speech signals of target the speaker into at least one of spectral envelopes, aperiodicity envelopes, fundamental frequencies, or voicing.

9. The method of claim 1, wherein determining for each given source HMM state model the particular target-speaker vector from among the target set that most closely matches parameters of the set of generator-model functions of the given source HMM comprises:
making a determination an optimal correspondence between a multivariate probability density function (PDF) of the given source HMM and a particular target-speaker vector from among the target set, the determination being made under a transform that compensates for differences between speech of the source speaker and speech of the target speaker.

10. The method of claim 1, wherein constructing the converted HMM based speech features generator comprises transforming the source HMM based speech features generator into the converted HMM based speech features generator by replacing the parameters of the set of generator-model functions of each source HMM state model of the source HMM based speech features generator with the determined particular most closely matching target-speaker vector from among the target set,
and wherein speech-adapting the F0 statistics of the converted HMM based speech features generator using the F0 transform comprises speech-adapting the F0 statistics of the transformed source HMM based speech features generator using the F0 transform.

11. A method comprising:
implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker;
providing a set of target-speaker vectors, the set of target-speaker vectors having been generated from speech features extracted from speech signals of a target speaker;
implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker;

receiving an enriched transcription of a run-time text string by an input device of the system;

using the converted HMM based speech features generator to convert the enriched transcription into corresponding output speech features; and generating a synthesized utterance of the enriched transcription using the output speech features, the synthesized utterance having voice characteristics of the target speaker.

12. A system comprising:
one or more processors;
memory; and
machine-readable instructions stored in the memory, that upon execution by the one or more processors cause the system to carry out functions including:
implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker;
providing a set of target-speaker vectors, the set of target-speaker vectors having been generated from speech features extracted from speech signals of a target speaker;
implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker.

13. The system of claim 12, wherein the functions further include:
creating an enriched transcription of a run-time text string;
using the speech-adapted converted HMM based speech features generator to convert the enriched transcription into corresponding output speech features; and
generating a synthesized utterance of the enriched transcription using the output speech features, the synthesized utterance having voice characteristics of the target speaker.

14. The system of claim 13, wherein the system is part of a text-to-speech (TTS) system,
wherein creating the enriched transcription of the run-time text string comprises receiving the run-time text string at the TTS system, and converting the received run-time text string into the enriched transcription of the run-time text string by the TTS system,
and wherein generating the synthesized utterance of the enriched transcription using the output speech features comprises synthesizing speech by the TTS system.

15. The system of claim 12, wherein the set of generator-model functions for each given source HMM state model comprises a multivariate spectral probability density function (PDF) for jointly modeling spectral envelope parameters of a phonetic unit modeled by a given source HMM state model, and a multivariate excitation PDF for jointly modeling excitation parameters of the phonetic unit,
and wherein determining for each given source HMM state model the particular target-speaker vector from among the target set that most closely matches parameters of the set of generator-model functions of the given source HMM comprises:
determining a target-speaker vector from among the target set that is computationally nearest to parameters of the multivariate spectral PDF of the given source HMM state model in terms of a distance criterion based on one of mean-squared-error (mse) or Kullback-Leibler distance; and
determining a target-speaker vector from among the target set that is computationally nearest to the multivariate excitation PDF of the given source HMM state model in terms of a distance criterion based on one of mse or Kullback-Leibler distance.

16. The system of claim 15, wherein the multivariate spectral PDF of at least one source HMM state model has the mathematical form of a multivariate Gaussian function.

17. The system of claim 15, wherein the phonetic unit is one of a phoneme or a triphone.

18. The system of claim 15, wherein the spectral envelope parameters of the phonetic unit are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit,
and wherein extracting speech features from speech signals of target the speaker comprises decomposing the speech signals of target the speaker into at least one of spectral envelopes, aperiodicity envelopes, fundamental frequencies, or voicing.

19. The system of claim 12, wherein the particular target-speaker vector from among the target set that most closely matches parameters of the set of generator-model functions of the given source HMM comprises a particular target-speaker vector from among the target set that optimally corresponds to parameters of a multivariate PDF of the given source HMM state model, the optimal correspondence being determined under a transform that compensates for differences between speech of the source speaker and speech of the target speaker.

20. The system of claim 12, wherein implementing the converted HMM based speech features generator comprises:
transforming the implemented source HMM based speech features generator into the converted HMM based speech features generator by replacing the parameters of the set of generator-model functions of each source HMM state model of the source HMM based speech features generator with the determined particular most closely matching target-speaker vector from among the target set; and
speech-adapting the F0 statistics of the transformed source HMM based speech features generator using the F0 transform.

21. A non-transitory computer-readable storage medium having stored thereon program instructions that, upon execution by one or more processors of a system, cause the system to perform operations comprising:
implementing a source hidden Markov model (HMM) based speech features generator by one or more processors of a system, wherein the source HMM based speech features generator comprises a configuration of source HMM state models, each of the source HMM state models having a set of generator-model functions, and wherein the implemented source HMM based speech features generator is trained using speech signals of a source speaker;

providing a set of target-speaker vectors, the set of target-speaker vectors having been generated from speech features extracted from speech signals of a target speaker;

implementing a converted HMM based speech features generator that is the same as the source HMM based speech features generator, but wherein (i) parameters of the set of generator-model functions of each given source HMM state model of the converted HMM based speech features generator are replaced with a particular target-speaker vector from among the target set that most closely matches the parameters of the set of generator-model functions of the given source HMM, and (ii) fundamental frequency (F0) statistics of the converted HMM based speech features generator are speech-adapted using an F0 transform that speech-adapts F0 statistics of the source HMM based speech features generator to match F0 statistics of the speech of the target speaker.

22. The non-transitory computer-readable storage medium of claim 21, wherein the operations further include:

creating an enriched transcription of a run-time text string;

using the speech-adapted converted HMM based speech features generator to convert the enriched transcription into corresponding output speech features; and generating a synthesized utterance of the enriched transcription using the output speech features, the synthesized utterance having voice characteristics of the target speaker.

23. The non-transitory computer-readable storage medium of claim 22, wherein the converted HMM based speech features generator is part of a text-to-speech (TTS) system, wherein creating the enriched transcription of the run-time text string comprises receiving the run-time text string at the TTS system, and converting the received run-time text string into the enriched transcription of the run-time text string by the TTS system, and wherein generating the synthesized utterance of the enriched transcription using the output speech features comprises synthesizing speech by the TTS system.

24. The non-transitory computer-readable storage medium of claim 21, wherein the set of generator-model functions for each given source HMM state model comprises a multivariate spectral probability density function (PDF) for jointly modeling spectral envelope parameters of a phonetic unit modeled by a given source HMM state model, and a multivariate excitation PDF for jointly modeling excitation parameters of the phonetic unit, and wherein determining for each given source HMM state model the particular target-speaker vector from among the target set that most closely matches parameters of the set of generator-model functions of the given source HMM comprises:

determining a target-speaker vector from among the target set that is computationally nearest to parameters of the multivariate spectral PDF of the given source HMM state model in terms of a distance criterion based on one of mean-squared-error (mse) or Kullback-Leibler distance; and determining a target-speaker vector from among the target set that is computationally nearest to the multivariate excitation PDF of the given source HMM state model in terms of a distance criterion based on one of mse or Kullback-Leibler distance.

25. The non-transitory computer-readable storage medium of claim 24, wherein the multivariate spectral PDF of at least one source HMM state model has the mathematical form of a multivariate Gaussian function.

26. The non-transitory computer-readable storage medium of claim 24, wherein the phonetic unit is one of a phoneme or a triphone.

27. The non-transitory computer-readable storage medium of claim 24, wherein the spectral envelope parameters of the phonetic unit are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit, and wherein extracting speech features from speech signals of target the speaker comprises decomposing the speech signals of target the speaker into at least one of spectral envelopes, aperiodicity envelopes, fundamental frequencies, or voicing.

28. The non-transitory computer-readable storage medium of claim 21, wherein the particular target-speaker vector from among the target set that most closely matches parameters of the set of generator-model functions of the given source HMM comprises a particular target-speaker vector from among the target set that optimally corresponds to parameters of a multivariate PDF of the given source HMM state model, the optimal correspondence being determined under a transform that compensates for differences between speech of the source speaker and speech of the target speaker.

29. The non-transitory computer-readable storage medium of claim 21, wherein implementing the converted HMM based speech features generator comprises:

transforming the implemented source HMM based speech features generator into the converted HMM based speech features generator by replacing the parameters of the set of generator-model functions of each source HMM state model of the source HMM based speech features generator with the determined particular most closely matching target-speaker vector from among the target set; and speech-adapting the F0 statistics of the transformed source HMM based speech features generator using the F0 transform.

30. A non-transitory computer-readable storage medium, having stored thereon program instructions that, upon execution by one or more processors of a system, cause the system to perform operations comprising:

training an source hidden Markov model (HMM) based speech features generator using speech signals of a source speaker, wherein the source HMM based speech features generator comprises a configuration of source HMM state models, each of the source HMM state models having a set of generator-model functions;

extracting speech features from speech signals of a target speaker to generate a target set of target-speaker vectors;

for each given source HMM state model of the configuration, determining a particular target-speaker vector from among the target set that most closely matches parameters of the set of generator-model functions of the given source HMM;

determining a fundamental frequency (F0) transform that speech-adapts F0 statistics of the source HMM based speech features generator to match F0 statistics of the speech of the target speaker;

constructing a converted HMM based speech features generator to be the same as the source HMM based speech features generator, but wherein the parameters of the set of generator-model functions of each source HMM state model of the converted HMM based speech features generator are replaced with the determined particular most closely matching target-speaker vector from among the target set; and speech-adapting F0 statistics of the converted HMM based speech features generator using the F0 transform to thereby produce a speech-adapted converted HMM based speech features generator.

\* \* \* \* \*